(12) United States Patent
Kondo et al.

(10) Patent No.: US 11,304,536 B2
(45) Date of Patent: Apr. 19, 2022

(54) BEDDING AND BEDDING COVER SHEET

(71) Applicant: AIRWEAVE INC., Aichi (JP)

(72) Inventors: Taeko Kondo, Aichi (JP); Masakazu Kojima, Aichi (JP)

(73) Assignee: AIRWEAVE INC., Aichi (JP)

( * ) Notice: Subject to any disclaimer, the term of this patent is extended or adjusted under 35 U.S.C. 154(b) by 573 days.

(21) Appl. No.: 16/305,894

(22) PCT Filed: Jul. 25, 2017

(86) PCT No.: PCT/JP2017/026836
§ 371 (c)(1),
(2) Date: Nov. 30, 2018

(87) PCT Pub. No.: WO2018/021292
PCT Pub. Date: Feb. 1, 2018

(65) Prior Publication Data
US 2020/0315365 A1    Oct. 8, 2020

(30) Foreign Application Priority Data
Jul. 28, 2016    (JP) .............................. JP2016-148555

(51) Int. Cl.
*B32B 5/02*    (2006.01)
*B32B 5/26*    (2006.01)
(Continued)

(52) U.S. Cl.
CPC .......... *A47C 27/006* (2013.01); *A47C 27/007* (2013.01); *A47C 27/12* (2013.01); *A47D 15/001* (2013.01); *A47G 9/0238* (2013.01); *A47G 9/10* (2013.01); *B32B 3/266* (2013.01); *B32B 5/024* (2013.01); *B32B 5/026* (2013.01);
(Continued)

(58) Field of Classification Search
None
See application file for complete search history.

(56) References Cited

U.S. PATENT DOCUMENTS

| | | | | |
|---|---|---|---|---|
| 3,591,875 A | * | 7/1971 | Zipf, III | A47C 27/005 5/487 |
| 3,965,503 A | * | 6/1976 | Gridel | A47C 27/005 5/484 |

(Continued)

FOREIGN PATENT DOCUMENTS

| | | | | |
|---|---|---|---|---|
| CA | 1118118 A | * | 2/1982 | ........... A47C 31/105 |
| CA | 2152135 A1 | * | 12/1995 | ........... A47C 31/006 |

(Continued)

OTHER PUBLICATIONS

Machine Translation of JP-63050550-A, Mar. 1988 (Year: 1988).*
(Continued)

*Primary Examiner* — Jeffrey A Vonch
(74) *Attorney, Agent, or Firm* — JCIPRNET

(57) ABSTRACT

A bedding includes: a cushion layer which is formed with a filament three-dimensional bonded member and which is breathable; a breathable water-repellent layer which is provided on the upper side of the cushion layer and which is breathable and water-repellent; and a breathable water-retentive layer which is provided on the upper side of the breathable water-repellent layer and which is water-retentive and is breathable during water retention.

8 Claims, 10 Drawing Sheets

(51) Int. Cl.

| | |
|---|---|
| *B32B 3/24* | (2006.01) |
| *B32B 7/02* | (2019.01) |
| *A47C 27/12* | (2006.01) |
| *A47G 9/02* | (2006.01) |
| *A47D 15/00* | (2006.01) |
| *A47C 27/00* | (2006.01) |
| *A47G 9/10* | (2006.01) |
| *B32B 27/32* | (2006.01) |
| *B32B 3/26* | (2006.01) |
| *B32B 5/08* | (2006.01) |
| *B32B 27/12* | (2006.01) |
| *B32B 7/06* | (2019.01) |
| *A47C 31/00* | (2006.01) |
| *B32B 3/04* | (2006.01) |
| *A47C 31/10* | (2006.01) |
| *A47C 21/04* | (2006.01) |

(52) U.S. Cl.
CPC ............ *B32B 5/26* (2013.01); *B32B 5/262* (2021.05); *B32B 5/2795* (2021.05); *B32B 7/02* (2013.01); *B32B 27/322* (2013.01); *A47C 21/046* (2013.01); *A47C 31/006* (2013.01); *A47C 31/105* (2013.01); *A47G 9/0253* (2013.01); *B32B 3/04* (2013.01); *B32B 5/08* (2013.01); *B32B 7/06* (2013.01); *B32B 27/12* (2013.01); *B32B 2250/03* (2013.01); *B32B 2250/04* (2013.01); *B32B 2250/05* (2013.01); *B32B 2250/20* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0284* (2013.01); *B32B 2262/04* (2013.01); *B32B 2262/062* (2013.01); *B32B 2262/065* (2013.01); *B32B 2262/14* (2013.01); *B32B 2305/026* (2013.01); *B32B 2305/18* (2013.01); *B32B 2305/182* (2013.01); *B32B 2305/186* (2013.01); *B32B 2305/188* (2013.01); *B32B 2307/724* (2013.01); *B32B 2307/726* (2013.01); *B32B 2307/728* (2013.01); *B32B 2307/7265* (2013.01); *B32B 2307/73* (2013.01); *B32B 2601/00* (2013.01); *D10B 2201/01* (2013.01); *D10B 2201/02* (2013.01); *D10B 2201/24* (2013.01); *D10B 2321/021* (2013.01); *D10B 2321/08* (2013.01); *D10B 2331/02* (2013.01); *D10B 2331/04* (2013.01); *D10B 2401/021* (2013.01); *D10B 2401/022* (2013.01); *D10B 2401/10* (2013.01); *D10B 2503/06* (2013.01); *Y10T 428/23* (2015.01); *Y10T 428/237* (2015.01); *Y10T 428/24322* (2015.01); *Y10T 428/24942* (2015.01); *Y10T 442/30* (2015.04); *Y10T 442/3976* (2015.04); *Y10T 442/40* (2015.04); *Y10T 442/488* (2015.04)

(56) References Cited

U.S. PATENT DOCUMENTS

| | | | | |
|---|---|---|---|---|
| 4,128,686 | A * | 12/1978 | Kyle | A61F 5/485 428/219 |
| 4,372,310 | A * | 2/1983 | Sergeant | A61F 13/49003 604/372 |
| 4,573,987 | A * | 3/1986 | Lamb, Jr. | A61F 13/49004 604/378 |
| 4,704,753 | A * | 11/1987 | Lunt | A47G 9/0246 5/484 |
| 4,772,281 | A * | 9/1988 | Armstead | A61F 5/485 5/484 |
| 4,843,666 | A * | 7/1989 | Elesh | A47C 27/144 5/723 |
| 5,008,141 | A * | 4/1991 | Shinozuka | A47C 27/12 112/402 |
| 5,042,099 | A * | 8/1991 | Brenner | A47G 9/02 5/502 |
| 5,065,600 | A * | 11/1991 | Byles | A61F 13/53747 66/193 |
| 5,085,653 | A * | 2/1992 | Levy | A61F 13/49003 604/358 |
| 5,086,530 | A * | 2/1992 | Blake | A47C 27/005 5/484 |
| 5,249,320 | A * | 10/1993 | Moretz | A61F 5/01 5/484 |
| 5,306,267 | A * | 4/1994 | Hahn | A61F 13/49004 604/358 |
| 5,330,817 | A * | 7/1994 | Arnott | A61F 5/485 428/85 |
| 5,438,719 | A * | 8/1995 | Anthony | A47G 9/02 5/485 |
| 5,639,543 | A * | 6/1997 | Isoda | D01D 5/22 428/220 |
| 5,806,925 | A * | 9/1998 | Hanley | A47C 31/113 297/219.1 |
| 5,817,391 | A * | 10/1998 | Rock | D04B 21/14 428/86 |
| 5,826,288 | A * | 10/1998 | Ecer | A47D 15/001 5/724 |
| 5,870,785 | A * | 2/1999 | Hoorens | A61F 5/48 5/652.1 |
| 6,083,857 | A * | 7/2000 | Bottger | B32B 7/08 442/370 |
| 6,151,928 | A * | 11/2000 | Anyon | D04B 1/16 66/196 |
| 6,223,371 | B1 * | 5/2001 | Antinori | A47C 27/144 5/655.9 |
| 6,233,762 | B1 * | 5/2001 | Bradley | A47C 21/022 5/484 |
| 6,274,520 | B1 * | 8/2001 | Cordell | A47G 9/0238 442/381 |
| 6,381,778 | B1 * | 5/2002 | Peterson | A47C 27/005 5/484 |
| 6,593,256 | B1 * | 7/2003 | Wildeman | D04H 1/43835 442/402 |
| 6,854,296 | B1 * | 2/2005 | Miller, III | D04B 1/123 66/190 |
| 7,120,952 | B1 * | 10/2006 | Bass | A47C 27/006 5/484 |
| 7,930,779 | B2 * | 4/2011 | Marrache | A47C 31/105 5/498 |
| 8,464,657 | B1 * | 6/2013 | King | A01K 1/0353 119/28.5 |
| 9,155,408 | B2 | 10/2015 | Alletto, Jr. | |
| 9,247,830 | B2 * | 2/2016 | Waters | A47D 9/00 |
| 9,788,661 | B1 * | 10/2017 | Alletto | A47C 21/046 |
| 9,924,812 | B1 * | 3/2018 | Kennedy | A47G 9/0246 |
| 2002/0094740 | A1 * | 7/2002 | Li | B32B 5/26 442/213 |
| 2002/0148047 | A1 * | 10/2002 | Corzani | A47C 31/007 5/738 |
| 2002/0198508 | A1 * | 12/2002 | Takatera | A61F 13/537 604/383 |
| 2003/0092335 | A1 * | 5/2003 | Takaoka | D04H 3/16 442/1 |
| 2003/0114820 | A1 * | 6/2003 | Wildeman | A61F 13/15577 604/383 |
| 2003/0177579 | A1 * | 9/2003 | Diak/Ghanem | A47G 9/02 5/499 |
| 2003/0181118 | A1 * | 9/2003 | Ko | B32B 5/26 442/335 |
| 2004/0059055 | A1 * | 3/2004 | Inada | D04H 1/4309 525/56 |
| 2004/0077243 | A1 * | 4/2004 | Strongwater | B32B 27/36 442/247 |

(56) References Cited

U.S. PATENT DOCUMENTS

| | | | |
|---|---|---|---|
| 2006/0100597 A1* | 5/2006 | Miskie | A61F 13/505 604/378 |
| 2006/0198993 A1* | 9/2006 | Goyarts | D06M 17/10 428/196 |
| 2006/0264863 A1* | 11/2006 | Blyth | A61F 5/485 604/393 |
| 2007/0271705 A1* | 11/2007 | Woolfson | A47C 27/001 5/655.9 |
| 2008/0044607 A1* | 2/2008 | Menday | A61F 13/15 428/36.2 |
| 2008/0096001 A1* | 4/2008 | Emden | D03D 15/00 428/222 |
| 2008/0098529 A1* | 5/2008 | Flocard | A47C 21/044 5/652.2 |
| 2008/0157575 A1* | 7/2008 | Janz | B60N 2/5664 297/218.1 |
| 2009/0056030 A1* | 3/2009 | Bolden | A61G 7/05792 5/713 |
| 2009/0070932 A1* | 3/2009 | Min | A47D 15/02 5/484 |
| 2010/0009587 A1* | 1/2010 | Tillery | A47G 9/0253 442/327 |
| 2010/0088818 A1* | 4/2010 | Rock | A47C 27/007 5/483 |
| 2010/0122417 A1* | 5/2010 | Vrzalik | A47C 27/007 5/652.1 |
| 2010/0237671 A1* | 9/2010 | Danziger | B60N 2/2812 297/219.12 |
| 2010/0275379 A1* | 11/2010 | Streightiff | A47D 15/001 5/724 |
| 2011/0000020 A1* | 1/2011 | Walvius | A47G 9/02 5/495 |
| 2011/0053449 A1* | 3/2011 | Kulkarni | B32B 5/024 442/182 |
| 2011/0283459 A1* | 11/2011 | Essers | A61G 7/05715 5/699 |
| 2012/0053545 A1* | 3/2012 | Love | B32B 27/32 604/365 |
| 2012/0124740 A1* | 5/2012 | Castle | A47D 15/003 5/420 |
| 2012/0272438 A1* | 11/2012 | Cahisa Gallardo | A41D 31/065 2/455 |
| 2012/0297545 A1* | 11/2012 | Essers | A47C 27/005 5/691 |
| 2013/0198955 A1* | 8/2013 | Lishnevsky | A47C 31/105 5/496 |
| 2014/0000004 A1* | 1/2014 | Baron | D04B 21/207 2/69 |
| 2014/0101849 A1* | 4/2014 | Weinstein | A47G 9/02 5/484 |
| 2014/0143954 A1* | 5/2014 | Miner | A47D 15/001 5/484 |
| 2014/0189955 A1* | 7/2014 | Alletto, Jr. | A47G 9/0253 5/636 |
| 2014/0273700 A1* | 9/2014 | Mouhassin | A43B 7/125 442/319 |
| 2015/0013070 A1* | 1/2015 | Phillips | A47G 9/0246 5/636 |
| 2015/0074906 A1* | 3/2015 | Hiatt | A47C 31/105 5/484 |
| 2015/0087196 A1* | 3/2015 | Wakui | B68G 11/03 442/328 |
| 2015/0218737 A1* | 8/2015 | Blakely | D03D 15/68 428/131 |
| 2016/0066700 A1* | 3/2016 | Lin | A47C 27/121 5/652.1 |
| 2016/0090669 A1* | 3/2016 | Shiue | D03D 11/00 139/420 R |
| 2016/0157628 A1* | 6/2016 | Khambete | A47C 27/148 5/652 |
| 2016/0174725 A1* | 6/2016 | Takaoka | B32B 5/245 5/652.1 |
| 2016/0183689 A1* | 6/2016 | Miner | A47C 31/105 5/484 |
| 2016/0326674 A1* | 11/2016 | Goijarts | A61G 7/1026 |
| 2017/0035216 A1* | 2/2017 | MacKenzie | A47C 7/029 |
| 2017/0295961 A1* | 10/2017 | Alletto | A47G 9/0215 |
| 2018/0086623 A1* | 3/2018 | Takaoka | B33Y 80/00 |
| 2018/0142384 A1* | 5/2018 | Ogata | A41D 31/0005 |
| 2018/0371665 A1* | 12/2018 | Lin | D06B 19/0005 |

FOREIGN PATENT DOCUMENTS

| | | | |
|---|---|---|---|
| CN | 101014257 | 8/2007 | |
| CN | 202128206 | 2/2012 | |
| CN | 202820616 | 3/2013 | |
| CN | 202919711 | 5/2013 | |
| CN | 202981140 U * | 6/2013 | |
| CN | 203041475 U * | 7/2013 | |
| CN | 203417000 U * | 2/2014 | |
| CN | 203789531 | 8/2014 | |
| CN | 204617663 U * | 9/2015 | |
| CN | 105615440 | 6/2016 | |
| DE | 3635339 A1 * | 4/1988 | A61F 5/485 |
| DE | 4207278 A1 * | 9/1993 | B32B 9/02 |
| DE | 20309793 U1 * | 10/2003 | A47C 31/006 |
| DE | 20309795 U1 * | 10/2003 | A47C 27/006 |
| EP | 2431168 A1 * | 3/2012 | B32B 5/026 |
| ES | 2424565 A1 | 10/2013 | |
| FR | 2715282 A1 * | 7/1995 | A47G 9/10 |
| FR | 2768600 A1 * | 3/1999 | A47C 31/105 |
| FR | 2937844 A1 * | 5/2010 | A47G 9/0261 |
| GB | 1457192 A * | 12/1976 | A61F 5/485 |
| GB | 2189993 A * | 11/1987 | A61F 13/51305 |
| GB | 2292112 A * | 2/1996 | A47C 27/005 |
| GB | 2352735 A * | 2/2001 | A47C 27/006 |
| JP | 63050550 A * | 3/1988 | A47C 31/006 |
| JP | H0314187 U | 2/1991 | |
| JP | H03087247 | 4/1991 | |
| JP | H0355890 U | 5/1991 | |
| JP | 03112060 U * | 11/1991 | |
| JP | 05003894 A * | 1/1993 | A47G 9/10 |
| JP | 05023240 A * | 2/1993 | A47G 9/10 |
| JP | 05230770 A * | 9/1993 | A47G 9/10 |
| JP | 06316014 A * | 11/1994 | |
| JP | 3017588 U | 10/1995 | |
| JP | 08322683 A * | 12/1996 | |
| JP | 09070339 A * | 3/1997 | A47C 31/006 |
| JP | 11099034 A * | 4/1999 | |
| JP | 11099035 A * | 4/1999 | |
| JP | 11309183 A * | 11/1999 | |
| JP | H11309183 | 11/1999 | |
| JP | 2000027071 | 1/2000 | |
| JP | 2000107000 A * | 4/2000 | |
| JP | 3073281 U * | 11/2000 | A47C 27/122 |
| JP | 3074123 U * | 12/2000 | A47C 27/122 |
| JP | 2001008808 A * | 1/2001 | |
| JP | 2001046203 A * | 2/2001 | |
| JP | 3077499 U * | 5/2001 | A47C 31/105 |
| JP | 2001322196 A * | 11/2001 | |
| JP | 3087403 U * | 8/2002 | B32B 5/026 |
| JP | 2003306844 | 10/2003 | |
| JP | 3103626 U * | 8/2004 | |
| JP | 3111467 U * | 7/2005 | |
| JP | 3114879 U * | 10/2005 | |
| JP | 3115918 U * | 11/2005 | |
| JP | 2005304900 | 11/2005 | |
| JP | 3120836 U * | 4/2006 | |
| JP | 2006097223 A * | 4/2006 | A47C 27/122 |
| JP | 2009142495 A * | 7/2009 | |
| JP | 2010154965 | 7/2010 | |
| JP | 2010279687 | 12/2010 | |
| JP | 2011174190 A * | 9/2011 | |
| JP | 2011256495 | 12/2011 | |
| JP | 3178065 U * | 8/2012 | |
| JP | 3187535 U * | 12/2013 | |
| JP | 3197717 U * | 6/2015 | |
| JP | 2015101808 A * | 6/2015 | A47G 9/0261 |
| JP | 2015521695 | 7/2015 | |
| JP | 3207974 U * | 12/2016 | |
| KR | 101152922 B1 * | 6/2012 | |

(56) References Cited

FOREIGN PATENT DOCUMENTS

| TW | M338006 U | * | 8/2008 | |
|---|---|---|---|---|
| WO | WO-9203952 A1 | * | 3/1992 | ............... A47G 9/10 |
| WO | WO-9523541 A1 | * | 9/1995 | ............... A47G 9/10 |
| WO | WO-9607783 A1 | * | 3/1996 | ............. D04H 1/498 |
| WO | WO-9964238 A1 | * | 12/1999 | ............. B32B 27/40 |
| WO | WO-2005104905 A1 | * | 11/2005 | ........... A47C 31/006 |
| WO | WO-2017132724 A1 | * | 8/2017 | ........... A47G 9/0246 |

OTHER PUBLICATIONS

Machine Translation of DE-4207278-A1, Sep. 1993 (Year: 1993).*
Machine Translation of WO-2005104905-A1, Nov. 2005 (Year: 2005).*
Machine Translation of JP-2011174190-A, Sep. 2011 (Year: 2011).*
Machine Translation of ES-2424565-A1, Oct. 2013 (Year: 2013).*
"Office Action of Japan Counterpart Application", dated Sep. 17, 2019, with English translation, p. 1-p. 8.
"Office Action of China Counterpart Application", dated Aug. 11, 2020, with English translation, p. 1-p. 17.
"International Search Report (Form PCT/ISA/210)", dated Oct. 3, 2017, with English translation thereof, pp. 1-4.
"Office Action of China Counterpart Application", dated May 12, 2021, with English translation thereof, p. 1-p. 19.

* cited by examiner

BEDDING AND BEDDING COVER SHEET

CROSS-REFERENCE TO RELATED APPLICATION

This application is a 371 application of the International PCT application serial no. PCT/JP2017/026836, filed on Jul. 25, 2017, which claims the priority benefit of Japan Patent Application No. 2016-148555, filed on Jul. 28, 2016. The entirety of each of the above-mentioned patent applications is hereby incorporated by reference herein and made a part of this specification.

TECHNICAL FIELD

The present invention relates to bedding such as a mattress and a pillow and a bedding cover sheet.

BACKGROUND ART

There are often worries that when an infant who cannot freely turn over for himself or herself sleeps on his or her stomach, the mouth or the nose of the infant is blocked by bedding such as a mattress and a pillow so as to have difficulty in breathing.

On the other hand, in recent years, people, such as athletes, who care about sleep have begun to frequently use a mattress in which a filament three-dimensional bonded member obtained by three-dimensionally fusing filaments (threads) formed of a thermoplastic resin is used as a cushion material. For example, patent document 1 discloses an example of such a mattress.

The filament three-dimensional bonded member described above has a high porosity so as to have excellent breathability. Hence, as shown in FIG. 14, the filament three-dimensional bonded member is used as a cushion material for an infant mattress 700, and thus a certain degree of breathability can be acquired even when the face of an infant is embedded in the mattress and a pillow, with the result that it is possible to reduce a risk of failing to breathe.

RELATED ART DOCUMENT

Patent Document

Patent Document 1: Japanese Unexamined Patent Application Publication No. 2010-154965

DISCLOSURE OF THE INVENTION

Problems to be Solved by the Invention

Disadvantageously, however, since the filament three-dimensional bonded member has a structure in which a plurality of filaments are intertwined, when milk and drool vomited by the infant are infiltrated into the filament three-dimensional bonded member, it is difficult to wipe it off, with the result that bacteria breed and tend to be unsanitary.

Although it can be considered that in order to prevent milk and drool from being infiltrated into the filament three-dimensional bonded member, a cover sheet is provided on the upper surface of the filament three-dimensional bonded member, when the cover sheet is wetted by milk and drool, the breathability of the cover sheet is easily lowered. As milk and drool are more prevented from being infiltrated into the filament three-dimensional bonded member, the breathability when the cover sheet is wetted is easily lowered, with the result that it is difficult to achieve, at a high level, both the breathability and cleanliness when the cover sheet is wetted.

In view of the forgoing problem, the present invention has an object to provide bedding and a bedding cover sheet in which, for example, even when an infant vomits milk, drool and the like, the interior of a filament three-dimensional bonded member is prevented from being contaminated, and in which breathability is easily acquired.

Means for Solving the Problem

A bedding according to the present invention includes: a cushion layer which is formed with a filament three-dimensional bonded member and which is breathable; a breathable water-repellent layer which is provided on the upper side of the cushion layer and which is breathable and water-repellent; and a breathable water-retentive layer which is provided on the upper side of the breathable water-repellent layer and which is water-retentive and is breathable during water retention.

In this configuration, for example, even when an infant vomits milk, drool and the like, the interior of the filament three-dimensional bonded member is prevented from being contaminated, and breathability is easily acquired. The bedding of the present invention is arranged on the lower side of a user (for example, an infant) who lies, and examples thereof are a mattress and a pillow.

Preferably, in the configuration described above, more specifically, the bedding includes a non-water-retentive water permeable layer which is provided on the upper side of the breathable water-retentive layer, which is lower in water retention than the breathable water-retentive layer and which is breathable and water permeable. In this configuration, the non-water-retentive water permeable layer is tightly adhered to the skin and the like of the user who lies on the bedding so as to quickly guide water such as sweat to the breathable water-retentive layer and to evaporate water such as sweat into the atmosphere. In this way, it is possible to reduce a problem in which the front surface of the skin becomes sticky due to water such as sweat.

Preferably, in the configuration described above, more specifically, the breathable water-repellent layer is formed of a knitted fabric or a fabric using a hydrophobic thread formed of one or two or more hydrophobic fibers selected from a polyester fiber, a nylon fiber and an acrylic fiber, and the breathable water-retentive layer is formed of a knitted fabric or a fabric using two types of threads which is a hydrophilic thread formed of one or two or more hydrophilic fibers selected from a cotton fiber, a hemp fiber and a rayon fiber and a hydrophobic thread formed of one or two or more hydrophobic fibers selected from a polyester fiber, a nylon fiber and an acrylic fiber.

When in the breathable water-retentive layer, only the hydrophilic thread formed of the hydrophilic fiber such as a cotton fiber, a hemp fiber or rayon is used, in a state where the breathable water-retentive layer contains a large amount of water, a gap between the threads is blocked by water due to the surface tension of water. When a large gap is previously provided in a texture in order to prevent the blockage of the gap described above, the water retention is lowered, and thus it is necessary to increase the thickness of the texture in order to increase the water retention. In the breathable water-retentive layer, the hydrophilic thread formed of one or two or more hydrophilic fibers selected from a cotton fiber, a hemp fiber and a rayon fiber and the hydrophobic thread formed of one or two or more hydrophobic fibers selected from a polyester fiber, a nylon fiber and an acrylic fiber are used, and thus even in a state where the breathable water-retentive layer contains a large amount of water, a gap which is prevented from being blocked by the surface tension of water can be left in the vicinity of a contact point where the hydrophobic threads intersect each other, with the result that it is possible to acquire breathability while retaining water. Even if water is temporarily accumulated in the gap between the threads where the hydrophobic threads intersect each other, the hydrophilic threads are present in the vicinity thereof, and thus the water is sucked from the hydrophobic threads whose surface energy is low toward the hydrophilic threads whose surface energy is high, with the result that the water in the gap between the hydrophobic threads is moved to the hydrophilic threads.

Preferably, in the bedding configured as described above including a cushion member which includes the cushion layer and a cover sheet which is removable with respect to the cushion member, the breathable water-retentive layer is provided in the cover sheet. Preferably, in the bedding configured as described above including the cushion member which includes the cushion layer and the cover sheet which is removable with respect to the cushion member, the breathable water-retentive layer and the breathable water-repellent layer are provided in the cover sheet.

In this configuration, for example, the cushion member is removed from the dirty cover sheet, and thus it is possible to wash the cover sheet more easily. The bedding configured as described above may be a pillow or a mattress or another piece of bedding.

A bedding cover sheet according to the present invention is removable with respect to a cushion member that is formed with a filament three-dimensional bonded member and that is breathable and forms bedding together with the cushion member. The bedding cover sheet includes: a breathable water-repellent layer which is breathable and water-repellent; and a breathable water-retentive layer which is water-retentive and is breathable during water retention, and the bedding cover sheet is formed such that when the bedding cover sheet is fitted to the cushion member, the breathable water-repellent layer is arranged on the upper side of the cushion member, and that the breathable water-retentive layer is arranged on the upper side of the breathable water-repellent layer.

In this configuration, the bedding cover sheet is fitted to the cushion member, and thus it is possible to obtain an effect which is equivalent to the bedding according to the present invention or corresponds thereto and to easily wash the bedding cover sheet by removing the cushion member.

More specifically, in the bedding cover sheet configured as described above, the breathable water-repellent layer is formed of a knitted fabric or a fabric using a hydrophobic thread formed of one or two or more hydrophobic fibers selected from a polyester fiber, a nylon fiber and an acrylic fiber, and the breathable water-retentive layer is formed of a knitted fabric or a fabric using two types of threads which is a hydrophilic thread formed of one or two or more hydrophilic fibers selected from a cotton fiber, a hemp fiber and a rayon fiber and a hydrophobic thread formed of one or two or more hydrophobic fibers selected from a polyester fiber, a nylon fiber and an acrylic fiber.

Preferably, in the configuration described above, more specifically, the bedding cover sheet includes a non-water-retentive water permeable layer which is lower in water retention than the breathable water-retentive layer and which is breathable and water permeable, and the bedding cover sheet is fitted to the cushion member such that the non-water-retentive water permeable layer is arranged on the upper side of the breathable water-retentive layer. In this configuration, the non-water-retentive water permeable layer is tightly adhered to the skin or the like of the user who lies on the bedding so as to quickly guide water such as sweat to the breathable water-retentive layer and to evaporate water such as sweat into the atmosphere. In this way, it is possible to reduce a problem in which the surface of the skin becomes sticky due to water such as sweat.

Advantages of the Invention

In bedding or a bedding cover sheet according to the present invention, for example, even when an infant vomits milk, drool and the like, the interior of a filament three-dimensional bonded member is prevented from being contaminated, and breathability is easily acquired.

DESCRIPTION OF EMBODIMENTS

Embodiments of the present invention will be described below with reference to drawings. An up/down direction, a lateral direction and a forward/backward direction (which are orthogonal to each other) in the description of a mattress and a pillow are indicated in the individual figures. For convenience, the up/down direction is determined so as to coincide with the direction of thickness of a mattress shown in FIG. 1 and the like, and the forward/backward direction is determined so as to coincide with the longitudinal direction of the mattress (direction of height of a user who lies on the mattress).

1. First Embodiment

Figure 1:
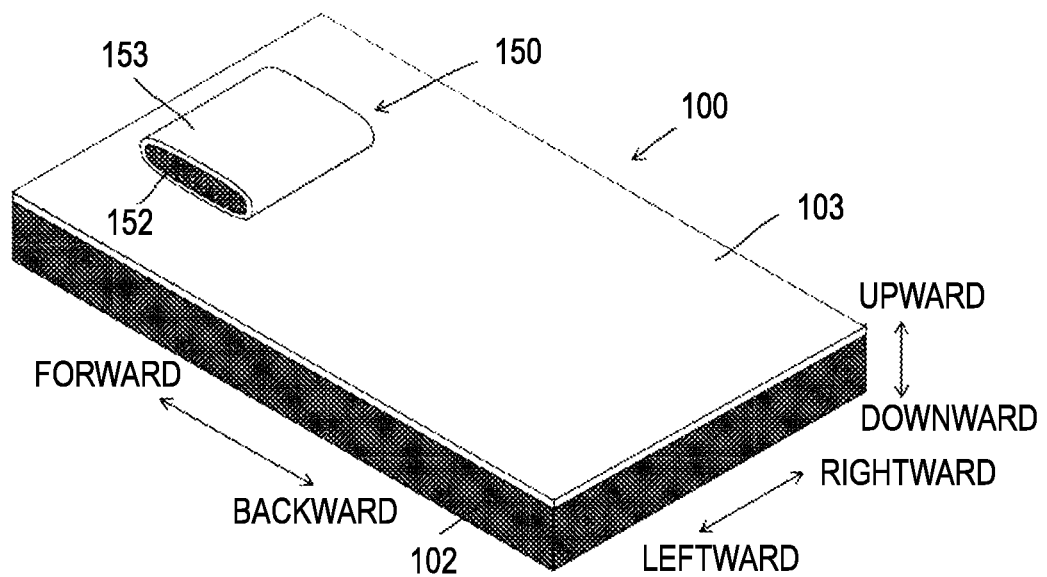
FIG. 1 An external perspective view of an infant bedding set according to a first embodiment.
Figure 2:
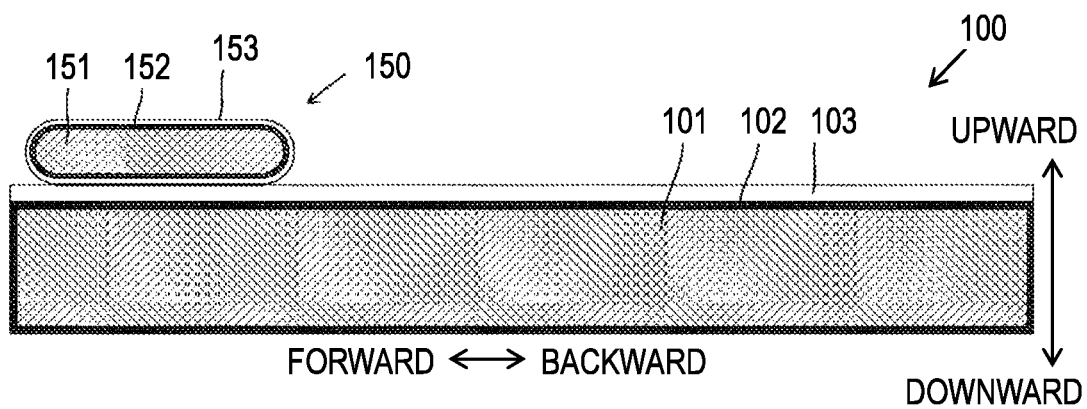
FIG. 2 A cross-sectional view of the bedding set shown in FIG. 1.

A first embodiment of the present invention will first be described. FIG. 1 is an external perspective view of an infant bedding set according to the present embodiment. FIG. 2 is a cross-sectional view taken along a plane which laterally divides the bedding set shown in FIG. 1. The bedding set shown in these figures is a bedding set in which a pillow 150 is placed on a mattress 100. Each of the mattress 100 and the pillow 150 is one form of bedding which is arranged below an infant who lies.

Although described in detail later, the configurations of the mattress 100 and the pillow 150 are designed so as not to prevent breathing as much as possible even when the face of an infant who lies on his or her stomach is embedded. In the bedding set described above, even when the face of the infant who lies on his or her stomach is embedded in either of the mattress 100 and the pillow 150, the infant can breathe relatively easily.

The mattress 100 and the pillow 150 can also be used separately as independent pieces of bedding. For example, the mattress 100 can be used such that the infant is put to sleep on the mattress 100 without use of the pillow 150, and the pillow 150 can be used such that the pillow 150 is placed on a general mattress or shikibuton and that the infant is put to sleep with his or her head on the pillow 150.

The mattress 100 includes: a breathable cushion layer 101 which is breathable; a breathable water-repellent layer 102 which is breathable and water-repellent; and a breathable water-retentive layer 103 which is water-retentive and is breathable during water retention. For example, these individual layers are arranged so as to be stacked and can then be integrated such as by being adhered or sewn.

The breathable cushion layer 101 (as with a breathable cushion layer 151 for a pillow which will be described later) is a filament three-dimensional bonded member which is formed by three-dimensionally fusing filaments (threads) made of a thermoplastic resin and which has a high porosity so as to have excellent breathability. A device for manufacturing the filament three-dimensional bonded member and a method of manufacturing it will be described in detail later. The breathable cushion layer 101 is formed in a size suitable for the mattress which supports, from below, the whole body of the infant who lies.

The breathable water-repellent layer 102 is provided so as to cover the entire breathable cushion layer 101 (including the upper surface of the breathable cushion layer 101. The breathable water-repellent layer 102 (as with a breathable water-repellent layer 152 for a pillow which will be described later) is a layer which has breathability equal to or higher than a dried mask and which is formed of a water-impenetrable porous hydrophobic material. The hydrophobic material refers to a polymer material containing, as a main component, a unit which does not include a polar group, such as a hydroxyl group, having a high affinity for water (here, consideration is not given to a polar group at a polymer terminal), and the hydrophobic material has a low hydrophilicity (a low surface energy and a high water repellency) and is unlikely to adsorb water (easily repels water). Examples of the hydrophobic material include polyester, nylon, acrylic, polyethylene and polytetrafluoroethylene. The breathable water-repellent layer 102 has water repellency (hydrophobicity) higher than the breathable water-retentive layer 103, and plays a role in sufficiently reducing the infiltration of milk, drool and the like into the breathable cushion layer 101 while minimizing the inhibition of breathability.

In the breathable water-repellent layer 102, it is preferable to obtain such breathability that the infant who lies on his or her stomach can easily breathe. As the breathable water-repellent layer 102, for example, a porous fabric or a porous knitted fabric in which about 1,000 to 10,000 holes having a diameter of 0.5 to 2 mm are formed per 100 square centimeters, whose thickness is 0.5 to 5 mm and which is formed of a fiber of a hydrophobic material (hydrophobic fiber) or a porous sheet in which about 300 to 3,000 holes having a diameter of 1 to 2 mm are formed per 100 square centimeters, whose thickness is 0.5 to 2 mm and which is formed of a hydrophobic resin such as polytetrafluoroethylene (PTFE) can be used. As the breathable water-repellent layer 102, plain woven cloth (fabric) using a thick thread can also be used. When a gap between adjacent threads is excessively narrow, breathability is lowered whereas when the gap is excessively wide, waterproof performance is lowered. Hence, the distance between adjacent threads (which corresponds to the diameter of the hole) is preferably equal to or more than 0.1 mm but equal to or less than 2 mm, and is more preferably equal to or more than 0.2 mm but equal to or less than 1 mm.

Figure 13A:
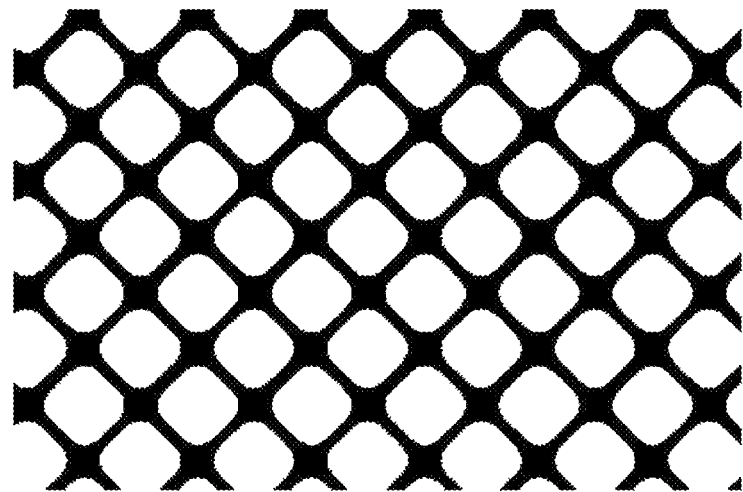
FIG. 13A An illustrative view for a mesh texture.
Figure 13B:
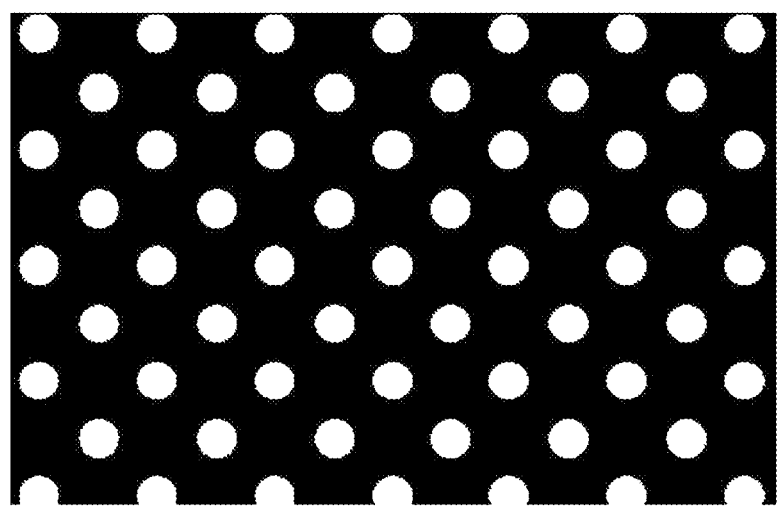
FIG. 13B An illustrative view for another mesh texture.
Figure 13C:
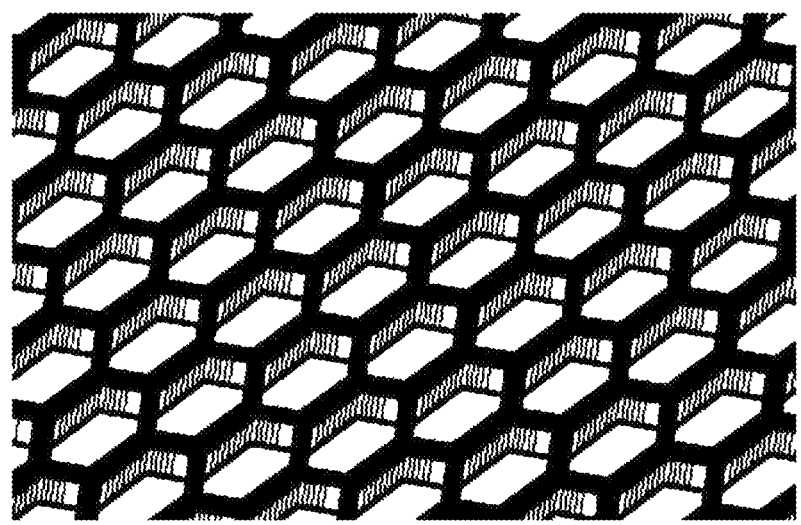
FIG. 13C An illustrative view for a double Russell texture.
Figure 14:
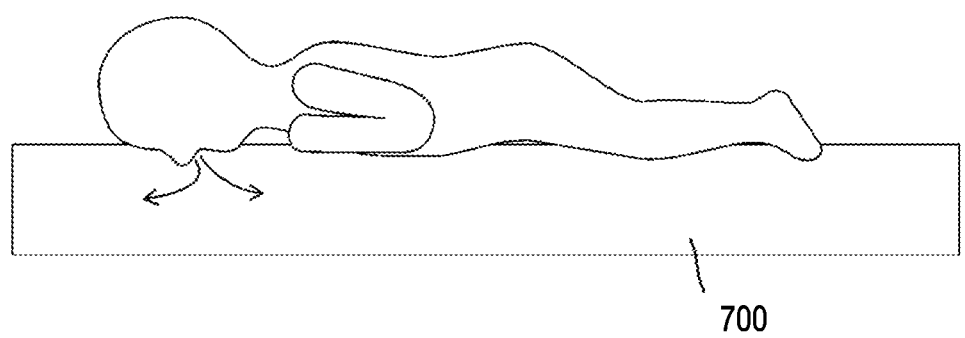
FIG. 14 An illustrative view for an infant mattress.

As the porous fabric or knitted fabric, a mesh texture, a double Russell texture or the like can be used which is formed of a hydrophobic fiber such as polyether, and a sheet of one of these textures can be used or a plurality of sheets thereof can be stacked and used. As the mesh texture, for example, a form shown in FIG. 13A or 13B can be applied, and as the double Russell texture, for example, a form shown in FIG. 13C can be applied. In particular, since one sheet of double Russell texture can have a sufficient layer thickness, the interlayer distance between the breathable cushion layer 101 and the breathable water-retentive layer 103 can be kept even when they are compressed and deformed, with the result that an effect of reducing the infiltration of milk, drool and the like from the breathable water-retentive layer 103 into the breathable cushion layer 101 is enhanced. Furthermore, as the hydrophobic fiber, a polyester fiber or a fluorocarbon fiber (polytetrafluoroethylene) on which water-repellent processing is performed with a fluororesin or the like is used fully or partially, and thus it is possible to easily repel water (enhance water repellency), with the result that the effect of reducing the infiltration of milk, drool and the like is further enhanced.

The breathable water-retentive layer 103 is provided on the upper side of the breathable cushion layer 101 so as to be opposite the entire upper surface of the breathable cushion layer 101 through the breathable water-repellent layer 102. The breathable water-retentive layer 103 preferably has a sufficiently higher water retention than the breathable cushion layer 101, and thus the breathable water-retentive layer 103 can more satisfactorily retain milk, drool and the like. The breathable water-retentive layer 103 (as with a breathable water-retentive layer 153 for a pillow which will be described later) has breathability equal to or higher than a dried mask in a dried state or in a wet state, and is a layer which is formed of a porous hydrophilic material (water-retentive material) that is excellent in water absorption and water retention and whose thickness is about 2 to 10 mm. The hydrophilic material refers to a polymer material containing, as a main component, a unit which includes a polar group, such as a hydroxyl group, having a high affinity for water, and the hydrophilic material has a high hydrophilicity (a high surface energy and a low water repellency) and is more likely to adsorb water (which is unlikely to repel water). Examples of the hydrophilic material include cellulose fibers such as cotton, hemp and rayon.

In the breathable water-retentive layer 103, it is necessary to obtain such a degree of breathability that even in a state where water is absorbed, it is possible to easily breathe. As the breathable water-retentive layer 103, for example, a porous fabric (gauze) or a porous knitted fabric in which about 100 to 3,000 holes having a diameter of 1 to 5 mm are formed per 100 square centimeters, whose thickness is 0.5 to 5 mm and which is formed of cotton or rayon or a porous sheet in which about 100 to 1,000 holes having a diameter of 2 to 5 mm are formed per 100 square centimeters, whose thickness is 2 to 5 mm and which is formed of a hydrophilic material such as polyvinyl alcohol (PVA) or chamois can be used. As the porous fabric or the knitted fabric, a mesh texture, a double Russell texture or the like can be used which is formed of a hydrophilic fiber such as cotton, and a sheet of one of these textures can be used or a plurality of sheets thereof can be stacked and used. In particular, since one sheet of double Russell texture can have a sufficient layer thickness, water retention can be enhanced, and thus the double Russell texture is preferable. As the breathable water-retentive layer 103, plain woven cloth (fabric) using a thick thread can also be used. When a gap between adjacent threads is excessively narrow, breathability is lowered during water retention whereas when the gap is excessively wide, water retention is lowered. Hence, the distance between adjacent threads (which corresponds to the diameter of the hole) is preferably equal to or more than 0.5 mm but equal to or less than 3 mm, and is more preferably equal to or more than 1 mm but equal to or less than 2 mm.

With respect to the water absorption of the breathable water-retentive layer 103 (and the breathable water-retentive layer 153 for a pillow), when a small amount of water is absorbed per unit area, milk and drool vomited by the infant are spread in a horizontal direction so as to be absorbed, and thus the absorption speed is lowered. Hence, the amount of water absorbed is preferably maximized. For example, the amount of water absorbed per unit area is preferably equal to or more than 20 g per 100 square centimeters, and is more preferably equal to or more than 50 g per 100 square centimeters.

In terms of ease of breathing of the infant who lies on his or her stomach, the breathable water-retentive layer 103 (and the breathable water-retentive layer 153 for a pillow) preferably has breathability as high as possible while acquiring necessary water-retentive performance. The breathability can be adjusted as necessary according to the respiratory power of the infant (power for sucking air and power for blowing out air).

As a specific value of breathability, the breathability of each of the layers (which correspond to the breathable water-repellent layer and the breathable water-retentive layer, and which additionally correspond to a non-water-retentive water permeable layer in second to fifth embodiments) which is measured with an appropriate breathability measurement method according to JIS L 1096-1999 8.2 7.1 A method A type (Frazier type method) is preferably equal to or more than 150 $cm^3/cm^2 \cdot s$, and the breathability of the entire cover sheet except the cushion layer is preferably equal to or more than 100 $cm^3/cm^2 \cdot s$.

As a specific example of a breathability measurement method for the breathable water-repellent layer (or the non-water-retentive water permeable layer in the second to fifth embodiments), a method is mentioned in which a specimen for the breathable water-repellent layer (or the non-water-retentive water permeable layer in the second to fifth embodiments) is collected, and in which a Frazier type testing machine (made by Yasuda Seiki Seisakusho Ltd.) is used. In this method, the specimen is attached to one end (intake side) of a cylinder in the testing machine, thereafter a suction fan is adjusted with a rheostat such that an inclined barometer indicates a pressure of 125 Pa, and from a pressure indicated here by a vertical barometer and the type of air hole used, the breathability ($cm^3/cm^2 \cdot s$) of air which is passed through the specimen is determined with a table attached to the testing machine.

As a specific example of a breathability measurement method for the breathable water-retentive layer, a method is mentioned in which a specimen of 20 cm×20 cm wetted by 80 g of water for the breathable water-retentive layer is collected, and in which the Frazier type testing machine (made by Yasuda Seiki Seisakusho Ltd.) is used. In this method, the specimen is attached to one end (intake side) of the cylinder in the testing machine, thereafter the suction fan is adjusted with the rheostat such that the inclined barometer indicates a pressure of 125 Pa, and from a pressure indicated here by the vertical barometer and the type of air hole used, the breathability ($cm^3/cm^2 \cdot s$) of air which is passed through the specimen is determined with the table attached to the testing machine.

As indicated in the present embodiment, the breathable water-repellent layer 102 which is formed of the hydrophobic material that is unlikely to adsorb water (that has a low hydrophilicity) is provided in a vertical direction below the breathable water-retentive layer 103 which is formed of the water-retentive material that easily adsorbs water (that has a high hydrophilicity), thus a barrier (surface energy gap) is formed which prevents the movement of water in an interface between the breathable water-retentive layer 103 and the breathable water-repellent layer 102 and the water present in the interface is attracted by this barrier to the breathable water-retentive layer 103 as compared with the breathable water-repellent layer 102, with the result that an effect of reducing the movement of milk, drool and the like containing water as a main component is enhanced.

As the material of the breathable water-repellent layer 102, absolute water repellency is not required, and the materials of the breathable water-retentive layer 103 and the breathable water-repellent layer 102 differ from each other in the level of hydrophobicity (water repellency). The materials may be selected such that, for example, the values of contact angles (both an advancing contact angle and a receding contact angle) of the breathable water-repellent layer 102 are higher than those of contact angles (both an advancing contact angle and a receding contact angle) of the breathable water-retentive layer 103.

In particular, in a porous sheet formed of polytetrafluoroethylene (PTFE) which does not use any fiber and which has an extremely high water repellency, water and dirt do not enter between fibers, and dirt is unlikely to be adhered thereto, with the result that the porous sheet is suitable as the material of the breathable water-repellent layer 102 (and the breathable water-repellent layer 152 for a pillow).

The breathable water-retentive layer 103 may be provided not only on the upper side of the breathable cushion layer 101 but also on the lower side thereof. In this way, it is possible to provide a reversible specification which achieves the same effect even when the mattress 100 is placed upside down. In this case, it is not necessary to worry about in which of the upward direction and the downward direction the mattress 100 is placed, and, for example, when the upper side of the mattress 100 becomes dirty, if the mattress 100 is turned upside down so as to be used as an emergency measure, it is possible to obtain an intended effect. This is true for mattresses in the second and third embodiments which will be described later.

In the present embodiment, the breathable water-repellent layer 102 is provided so as to cover the entire mattress 100, and thus it is possible to reduce the infiltration of water into the breathable cushion layer 101 from all directions. In other words, it is possible to reduce not only the infiltration of milk, drool and the like vomited by the infant from the upper side but also the infiltration of water from the lower side and the lateral side (forward and backward and leftward and rightward).

The pillow 150 includes: the breathable cushion layer 151 which is breathable; the breathable water-repellent layer 152 which is breathable and water-repellent; and the breathable water-retentive layer 153 which is water-retentive and is breathable during water retention. For example, these individual layers are arranged so as to be stacked and can then be integrated such as by being adhered or sewn.

With respect to the material, the dimension in the direction of thickness, the structure and the like, the breathable water-repellent layer 152 is equivalent to the breathable water-repellent layer 102 described above, and the breathable water-retentive layer 153 is equivalent to the breathable water-retentive layer 103 described above. In water retention, water absorption and water repellency, the breathable water-repellent layer 152 has properties equivalent to the breathable water-repellent layer 102, and the breathable water-retentive layer 153 has properties equivalent to the breathable water-retentive layer 103.

The breathable cushion layer 151 is the same filament three-dimensional bonded member as the breathable cushion layer 101, and can be manufactured by the same method as the breathable cushion layer 101. The breathable cushion layer 151 is formed in a size suitable for a pillow on which the head of the infant who lies is placed.

The breathable water-repellent layer 152 is provided so as to cover the entire breathable cushion layer 151 (including the surface on the upper side of the breathable cushion layer 151). The breathable water-repellent layer 152 has hydrophobicity (water repellency) higher than the breathable water-retentive layer 153, and plays a role in sufficiently reducing the infiltration of milk, drool and the like into the breathable cushion layer 151 while minimizing the inhibition of the breathability.

The breathable water-retentive layer 153 is provided so as to cover the entire breathable water-repellent layer 152. It can also be seen that the upper side portion of the breathable water-retentive layer 153 is provided on the upper side of the breathable cushion layer 151 so as to be opposite the entire upper surface of the breathable cushion layer 151 through the breathable water-repellent layer 152. The breathable water-retentive layer 153 preferably has a sufficiently higher water retention than the breathable cushion layer 151, and thus it is possible to retain milk, drool and the like more satisfactorily.

The breathable water-repellent layer 152 and the breathable water-retentive layer 153 are stacked so as to cover the entire outer side (including the upper side and the lower side) of the breathable cushion layer 151, and thus a reversible specification is provided which achieves the same effect even when the pillow 150 is placed upside down. Hence, it is not necessary to worry about in which of the upward direction and the downward direction the pillow 150 is placed, and, for example, when the upper side of the pillow 150 becomes dirty, if the pillow 150 is turned upside down so as to be used as an emergency measure, it is possible to obtain the intended effect.

However, for example, in order to reduce the manufacturing cost, the breathable water-repellent layer 152 may be provided so as to cover only the upper side of the breathable cushion layer 151, and the breathable water-retentive layer 153 may be provided so as to cover only the upper side of the breathable water-repellent layer 152. This is true for pillows in fourth and fifth embodiments which will be described later.

As described above, each piece of bedding (the mattress 100 and the pillow 150) according to the present embodiment includes: the cushion layer (the breathable cushion layer 101 or the breathable cushion layer 151) which is formed with the filament three-dimensional bonded member and which is breathable; and the breathable water-retentive layer (the breathable water-retentive layer 103 or the breathable water-retentive layer 153) which is provided on the upper side of the cushion layer and which is water-retentive and is breathable during water retention.

Hence, in each piece of bedding (the mattress 100 and the pillow 150), the breathable water-retentive layer can be interposed between the infant who lies and the cushion layer. In this way, for example, even when the infant vomits milk, drool and the like, the breathable water-retentive layer retains those, and thus it is possible to minimize the contamination of the interior of the filament three-dimensional bonded member. At the same time, even in a state where the breathable water-retentive layer retains milk, drool and the like, it is easy to acquire breathability, and thus it is possible to prevent the inhibition of the breathing of the infant who lies on his or her stomach.

As described above, each piece of bedding (the mattress 100 and the pillow 150) is designed such that the infant who lies on his or her stomach breathes as easily as possible while utilizing the properties (properties suitable for the bedding) of the filament three-dimensional bonded member excellent in breathability, elasticity and the like with the assumption that the infant vomits milk, drool and the like.

Although, preferably, in the breathable water-retentive layer described above, breathability is hardly lowered even when water such as milk, drool and the like is retained, even if breathability is slightly lowered by the retention of water, there are few problems as long as such breathability that the breathing of the infant who lies on his or her stomach can be ensured is maintained. With consideration given to this point, for example, the amount of water such as milk, drool and the like which can be vomited by the infant is previously estimated, and a breathable water-retentive layer which can maintain this degree of breathability even when the estimated amount of water is retained may be adopted as the breathable water-retentive layer.

In each piece of bedding (the mattress 100 and the pillow 150) in the present embodiment, the breathable water-repellent layer (the breathable water-repellent layer 102 or the breathable water-repellent layer 152) which is breathable and water-repellent is provided between the cushion layer and the breathable water-retentive layer. Hence, the infiltration of milk, drool and the like into the filament three-dimensional bonded member can be more sufficiently prevented. For example, even when a large amount of milk spills, the breathable water-repellent layer prevents the infiltration of milk into the cushion layer, and thus it is possible to minimize the contamination of the interior of the filament three-dimensional bonded member.

Most of milk, drool and the like spilling on each piece of bedding (the mattress 100 and the pillow 150) are accumulated in the breathable water-retentive layer but are not infiltrated into the cushion layer so as to be able to be removed relatively easily such as by washing and wiping the vicinity of the surface. Milk, drool and the like are appropriately removed, and thus it is possible to keep the bedding clean. For example, a material whose color is changed by water may be provided in the breathable water-retentive layer such that a portion containing milk, drool and the like can easily be grasped.

A configuration may be adopted in which in each piece of bedding (the mattress 100 and the pillow 150), a portion of the layers other than the cushion layer (in the present embodiment, a portion of the breathable water-repellent layer and the breathable water-retentive layer or a portion of the breathable water-retentive layer) is set such that the portion can be separated from the cushion layer, and in which thus each piece of bedding (the mattress 100 and the pillow 150) can be washed as it is with a household washing machine or the like. Embodiments in which the portion of the layers other than the cushion layer is provided in a bedding cover sheet will be described in detail as the third and fifth embodiments which will be discussed later.

In the present embodiment (the same is true for the second to sixth embodiments which will be described later), the breathable water-repellent layer is preferably formed of a knitted fabric or a fabric using a hydrophobic thread formed of one or two or more hydrophobic fibers selected from a polyester fiber, a nylon fiber and an acrylic fiber. The breathable water-retentive layer is preferably formed of a knitted fabric or a fabric using two types of threads which is a hydrophilic thread formed of one or two or more hydrophilic fibers selected from a cotton fiber, a hemp fiber and a rayon fiber and a hydrophobic thread formed of one or two or more hydrophobic fibers selected from a polyester fiber, a nylon fiber and an acrylic fiber.

The hydrophobic fiber (hydrophobic thread) in the present invention refers to a fiber (thread) which is formed of a polymer material containing, as a main component, a unit (monomer) that does not include a polar group, such as a hydroxyl group, having a high affinity for water, and examples thereof include a polyester fiber, a nylon fiber, an acrylic fiber and a polyethylene fiber. Among them, the polyester fiber is particularly preferable because it is excellent in durability and it can be obtained at low cost. The hydrophilic fiber (hydrophilic thread) in the present invention refers to a fiber (thread) which is formed of a polymer material containing, as a main component, a unit (monomer) that includes a polar group, such as a hydroxyl group, having a high affinity for water, and examples thereof include cellulose fibers such as a cotton fiber, a hemp fiber and a rayon fiber. Among them, the cotton fiber is particularly preferable because it is excellent in water absorption (water retention) and durability and it can be obtained at low cost.

When in the breathable water-retentive layer, only the hydrophilic thread formed of the hydrophilic fiber such as a cotton fiber, a hemp fiber or rayon is used, in a state where the breathable water-retentive layer contains a large amount of water, a gap between the threads is blocked by water due to the surface tension of water. When a large gap is previously provided in a texture in order to prevent the blockage of the gap described above, the water retention is lowered, and thus it is necessary to increase the thickness of the texture in order to increase the water retention.

In the breathable water-retentive layer, the hydrophilic thread formed of one or two or more hydrophilic fibers selected from a cotton fiber, a hemp fiber and a rayon fiber and the hydrophobic thread formed of one or two or more hydrophobic fibers selected from a polyester fiber, a nylon fiber and an acrylic fiber are used, and thus even in a state where the breathable water-retentive layer contains a large amount of water, a gap which is prevented from being blocked by the surface tension of water can be left in the vicinity of a contact point where the hydrophobic threads intersect each other, with the result that it is possible to acquire breathability.

Even if water is temporarily accumulated in the gap between the threads where the hydrophobic threads intersect each other, the hydrophilic threads are present in the vicinity thereof, and thus the water is sucked from the hydrophobic threads whose surface energy is low toward the hydrophilic threads whose surface energy is high, with the result that the water in the gap between the hydrophobic threads is moved to the hydrophilic threads.

Figure 3:
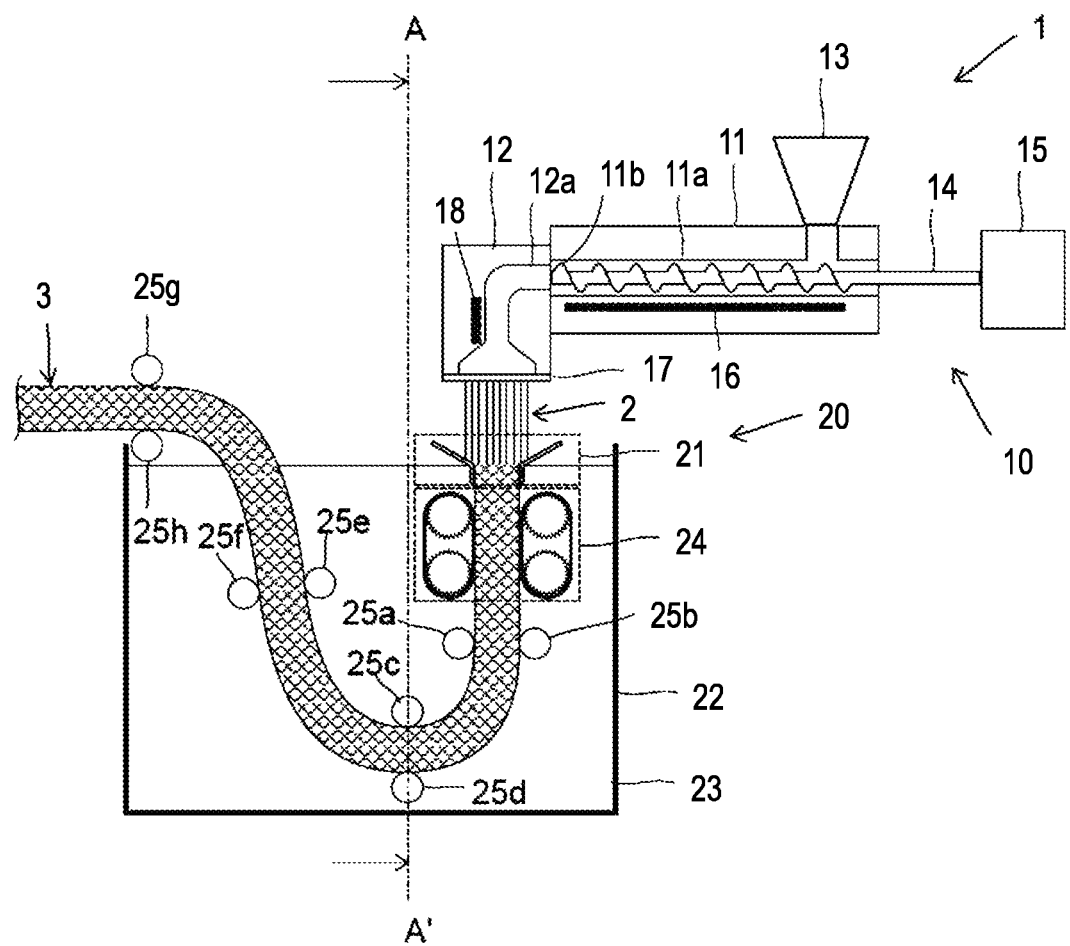
FIG. 3 A schematic configuration view of a filament three-dimensional bonded member manufacturing device.
Figure 4:
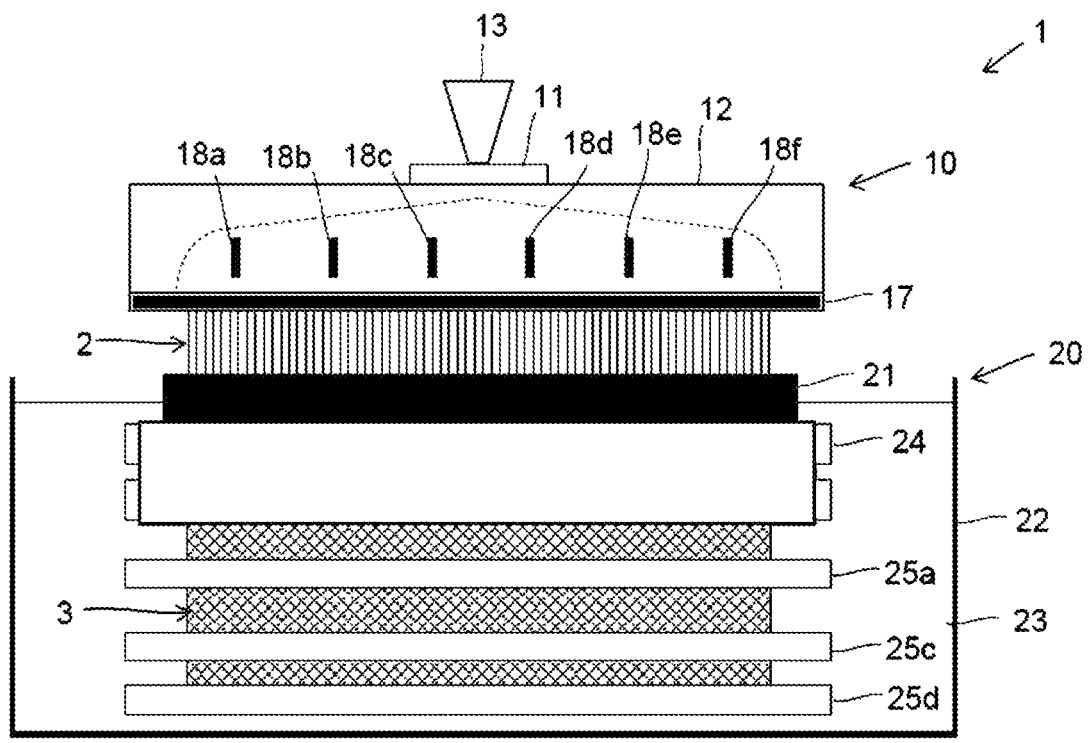
FIG. 4 A cross-sectional view of the filament three-dimensional bonded member manufacturing device shown in FIG. 3 taken along a line indicated by arrows.
Figure 5:
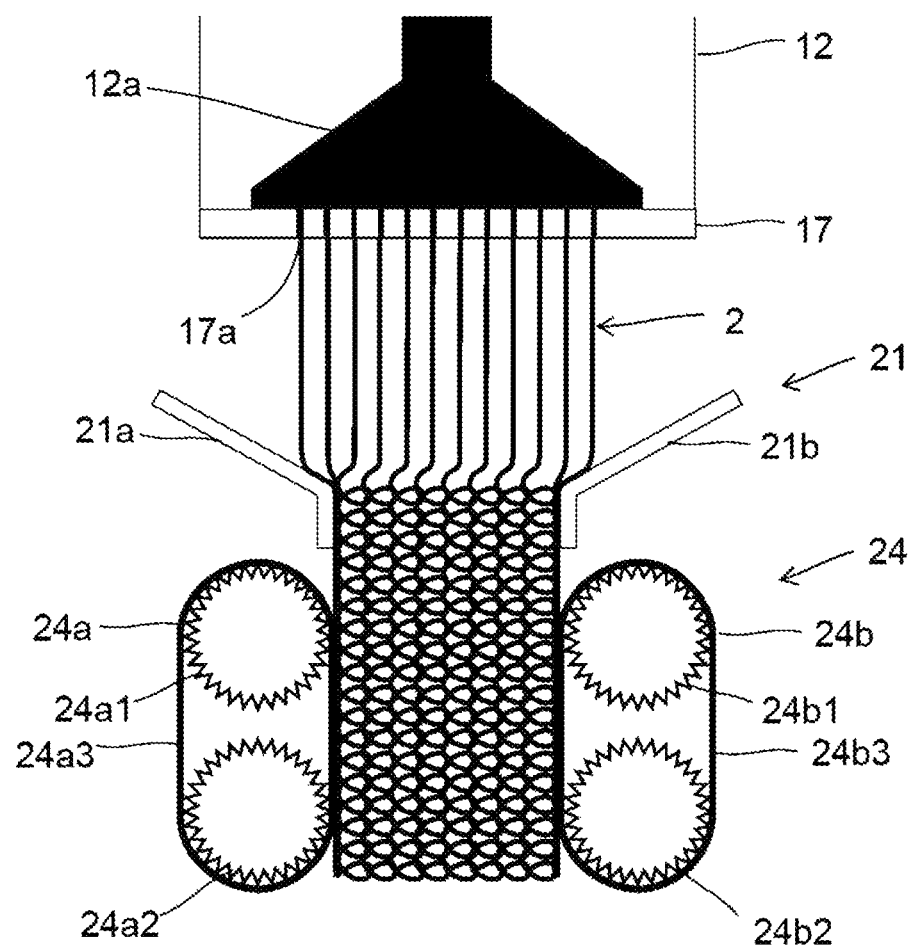
FIG. 5 A schematic configuration view of the vicinity of a nozzle plate shown in FIG. 3.

A device for manufacturing the filament three-dimensional bonded member which can be utilized in the breathable cushion layers 101 and 151 and a method of manufacturing it will then be described. FIG. 3 is a schematic configuration view of the filament three-dimensional bonded member manufacturing device 1. FIG. 4 is a cross-sectional view of the filament three-dimensional bonded member manufacturing device shown in FIG. 3 taken along line A-A' indicated by arrows. FIG. 5 is a more detailed configuration view of the vicinity of a nozzle plate 17 shown in FIG. 3.

The filament three-dimensional bonded member manufacturing device 1 includes: a molten filament supply device 10 which discharges a plurality of molten filaments vertically downward; a three-dimensional bonded member formation device 20 which three-dimensionally fuses the molten filaments and which cools and solidifies them so as to form a filament three-dimensional bonded member; and a thickness control device (unillustrated) which controls the thickness of the filament three-dimensional bonded member.

The molten filament supply device 1 includes a pressurization melting portion 11 (extruder) and a filament discharge portion 12 (*die*). The pressurization melting portion 11 includes a material input portion 13 (hopper), a screw 14, a screw motor 15, a screw heater 16 and a plurality of temperature sensors which are not shown.

Within the pressurization melting portion 11, a cylinder 11*a* for transporting a thermoplastic resin supplied from the material input portion 13 while heating and melting the thermoplastic resin is formed, and the screw 14 is rotatably stored. At an end portion of the cylinder 11*a* on the downstream side, a discharge port 11*b* for discharging the thermoplastic resin toward the filament discharge portion 12 is formed.

The filament discharge portion 12 includes the nozzle plate 17, a plurality of die heaters 18 (18*a* to 18*f*) and the unillustrated temperature sensors. Within the filament discharge portion 12, a guide flow path 12*a* is formed which guides, to the nozzle plate 17, the molten thermoplastic resin discharged from the discharge port 11*b* of the pressurization melting portion 11.

The nozzle plate 17 is a thick plate in which nozzles 17*a* that are a plurality of opening portions are formed, which is formed substantially in the shape of a rectangular parallelepiped and which is made of metal, and is provided in a lower portion of the filament discharge portion 12 which is the most downstream portion of the guide flow path 12*a*. Although in the present embodiment, the inside diameter of the circular nozzle 17*a* is set to 1 mm, and a distance (pitch) between adjacent nozzles 17*a* is set to 10 mm, based on the specification of a repulsive force of the filament three-dimensional bonded member, the nozzle shape, the nozzle inside diameter, the nozzle distance or the nozzle arrangement can be adjusted as necessary.

Examples of the thermoplastic resin which can be used as the material of the filament three-dimensional bonded member in the present embodiment include: polyolefin resins such as polyethylene and polypropylene; polyester resins such as polyethylene terephthalate; polyamide resins such as nylon 66; a polyvinyl chloride resin, a polystyrene resin and the like; and thermoplastic elastomers such as styrene elastomers, vinyl chloride elastomers, olefin elastomers, urethane elastomers, polyester elastomers, nitrile elastomers, polyamide elastomers and fluorine elastomers.

The thermoplastic resin supplied from the material input portion 13 is heated and melted within the cylinder 11a and is thereafter supplied as the molten thermoplastic resin from the discharge port 11b to the guide flow path 12a of the filament discharge portion 12, and a plurality of molten filaments are discharged from the nozzles 17a of the nozzle plate 17 toward the three-dimensional bonded member formation device 20.

The three-dimensional bonded member formation device 20 includes a filament three-dimensional bonded member thickness regulation portion 21 and a filament cooling portion 22. The filament three-dimensional bonded member thickness regulation portion 21 includes a pair of reception plates 21a and 21b. Each of the reception plates 21a and 21b is a metal plate that includes: an inclined surface which is inclined downward toward a center portion (in a direction in which the reception plates 21a and 21b approach each other) and which is formed in the shape of a flat plate; and a bent portion which includes a vertical surface that is extended downward in the vertical direction and that is formed in the shape of a flat plate. The reception plates 21a and 21b are installed symmetrically with respect to a plane with a predetermined distance left therebetween. In the three-dimensional bonded member formation device 20, in a direction (left/right direction in FIG. 5) which corresponds to the thickness of the filament three-dimensional bonded member, a mechanism for driving the reception plates 21a and 21b may be provided.

In the filament three-dimensional bonded member thickness regulation portion 21, while the molten filaments (molten filament group) discharged from the nozzle plate 17 are being regulated with a transport path in the direction of thickness of the filament three-dimensional bonded member, the molten filaments at both end portions in the direction of thickness are guided to a center portion, and the molten filaments are transported toward a water tank 23 which will be described later. In the three-dimensional bonded member formation device 20, by the utilization of the buoyancy action of cooling water in the water tank 23, the molten filaments are retained so as to form loops, and simultaneously, adjacent molten filaments are fused so as to form the filament three-dimensional bonded member. An unillustrated cooling water supply device may be provided in an upper portion of the reception plates 21a and 21b so as to supply the cooling water to the entire surface of the reception plates 21a and 21b.

The filament cooling portion 22 includes: the water tank 23 in which the cooling water is stored; a drawing portion 24 which draws and transports the molten filament group; a plurality of transport rollers 25 (25a to 25h); and a transport motor which drives a pair of conveyors 24a and 24b, and the transport rollers 25 (25a to 25h) through unillustrated gears. In the filament cooling portion 22, the molten filaments after the formation of three-dimensional bonding are cooled and solidified, and thus the filament three-dimensional bonded member is formed. The drawing portion 24 includes the pair of conveyors 24a and 24b which transport the filament three-dimensional bonded member.

The conveyor 24a includes a drive roller 24a1, a driven roller 24a2 and an endless belt 24a3 which is formed with a metal mesh placed over the drive roller 24a1 and the driven roller 24a2, and is driven to rotate by the unillustrated transport motor. The conveyor 24b includes a drive roller 24b1, a driven roller 24b2 and an endless belt 24b3 which is formed with a metal mesh placed over the drive roller 24b1 and the driven roller 24b2, and is driven to rotate by the unillustrated transport motor.

Although in the present embodiment, as the endless belts 24a3 and 24b3, the belt conveyors formed with the net-shaped metal meshes are used, as long as transport members are used, there is no particular limitation, and slat conveyors or the like may be used. The transport rollers 25a to 25h are respectively rotatably supported with unillustrated support members, and are simultaneously biased by an unillustrated spring in such a direction as to compress the filament three-dimensional bonded member such that a predetermined frictional force is obtained between the filament three-dimensional bonded members.

In the filament three-dimensional bonded member manufacturing device 1 described above, the molten filaments which are three-dimensionally fused are cooled and solidified, and thus it is possible to continuously form the filament three-dimensional bonded members, with the result that the filament three-dimensional bonded members which are cut to an appropriate size can be applied as the breathable cushion layers for the individual pieces of bedding (the mattress 100 and the pillow 150).

2. Second Embodiment

Figure 6:
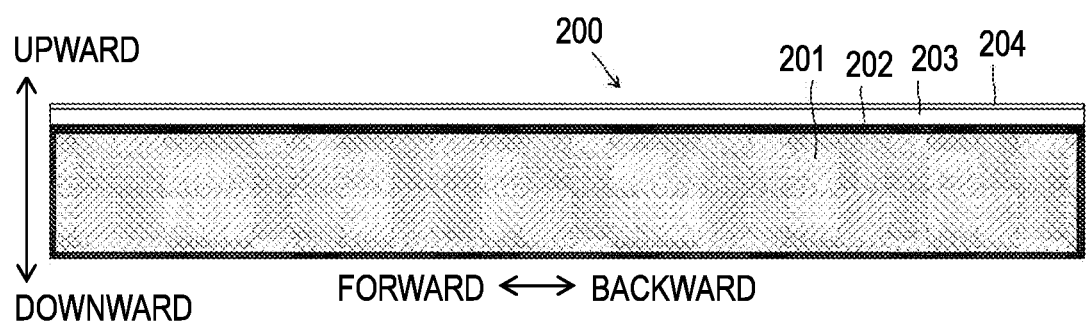
FIG. 6 A cross-sectional view of a mattress according to a second embodiment.

A second embodiment of the present invention will then be described. FIG. 6 is a cross-sectional view of a mattress 200 according to the second embodiment (cross-sectional view taken along a plane which laterally divides the mattress 200). The mattress 200 includes: a breathable cushion layer 201 which is breathable; a breathable water-repellent layer 202 which is breathable and water-repellent; a breathable water-retentive layer 203 which is water-retentive and is breathable during water retention; and a non-water-retentive water permeable layer 204.

The materials, the structures, the positional relationship and the like of the breathable cushion layer 201, the breathable water-repellent layer 202 and the breathable water-retentive layer 203 are respectively the same as the breathable cushion layer 101, the breathable water-repellent layer 102 and the breathable water-retentive layer 103 in the mattress 100 of the first embodiment, and thus the detailed description thereof will be omitted.

On the other hand, the non-water-retentive water permeable layer 204 is provided on the upper side of the breathable water-retentive layer 203 so as to be opposite the entire upper surface of the breathable water-retentive layer 203. The upper surface of the non-water-retentive water permeable layer 204 is the upper-side surface of the mattress 200.

The non-water-retentive water permeable layer 204 is a layer that is formed of a material which has a low water retention but which absorbs and diffuses water, is excellent in breathability and water permeability (water passage, moisture permeability) and easily passes through, for example, water such as sweat, milk, drool and the like. The non-water-retentive water permeable layer 204 has water retention lower than at least the breathable water-retentive layer 203. In the non-water-retentive water permeable layer 204, it is preferable to obtain such breathability that the infant who lies on his or her stomach can easily breathe. As the non-water-retentive water permeable layer 204, for example, a porous fabric or a porous knitted fabric can be used in which about 1,000 to 10,000 holes having a diameter of 0.5 to 3 mm are formed per 100 square centimeters and whose thickness is 0.5 to 5 mm.

As the material which absorbs and diffuses water, for example, a thread which is obtained by spinning an ultra-fine polyester fiber capable of absorbing and diffusing water by capillary action or a modified cross-section polyester fiber can be utilized, and a thread which is obtained by mixing a hydrophobic fiber such as a polyester fiber with 1 to 20% of a hydrophilic fiber such as rayon and spinning them can be used. In a case where as the non-water-retentive water permeable layer 204, plain woven cloth (gauze-shaped fabric) using a thick thread is used, when a gap between adjacent threads is excessively narrow, breathability is lowered whereas when the gap is excessively wide, the absorption and diffusion of water are lowered. Hence, the distance between adjacent threads (which corresponds to the diameter of the hole) is preferably equal to or more than 0.5 mm but equal to or less than 3 mm, and is more preferably equal to or more than 1 mm but equal to or less than 2 mm.

The non-water-retentive water permeable layer 204 has such action that the non-water-retentive water permeable layer 204 is tightly adhered to the skin of the infant who lies on the mattress 200 so as to quickly guide water such as sweat to the breathable water-retentive layer 203 and to evaporate water such as sweat into the atmosphere. In this way, an effect of reducing a problem in which the skin of the infant becomes sticky due to water such as sweat is obtained, and thus it is possible to more enhance comfort.

In order to provide a reversible specification in which even when the mattress 200 is placed upside down, the mattress 200 can be used, the breathable water-retentive layer 203 and the non-water-retentive water permeable layer 204 may be provided on both the upper and lower sides of the breathable cushion layer 201. The advantages of the reversible specification are the same as described in the first embodiment.

3. Third Embodiment

Figure 7:
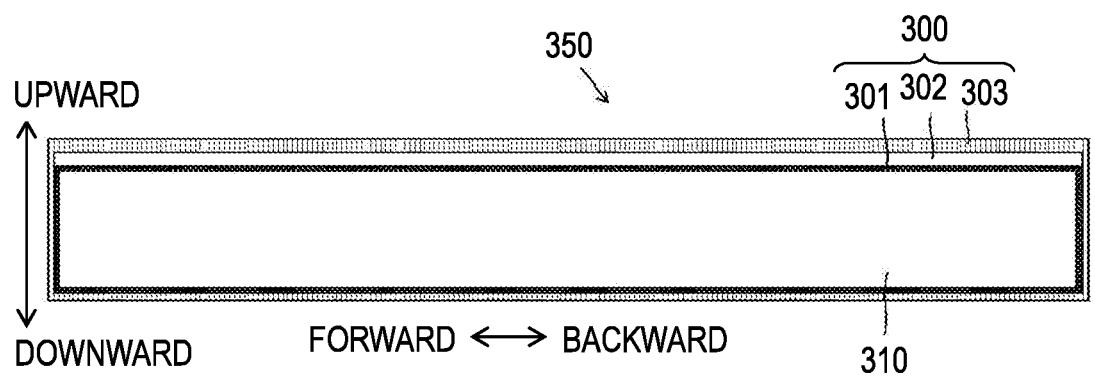
FIG. 7 A cross-sectional view of a mattress according to a third embodiment.

A third embodiment of the present invention will then be described. FIG. 7 is a cross-sectional view of a mattress 350 according to the third embodiment. In the present embodiment, attention is focused on the description of a mattress cover sheet 300, and thus with consideration given to ease of viewing, a cushion member 310 is displayed in white with a black outline.

The mattress 350 is formed with the cushion member 310 and the mattress cover sheet 300 (one form of the bedding cover sheet) which covers an outer peripheral portion of the cushion member 310. The mattress 350 is in a state where the cushion member 310 is inserted in the bag-shaped mattress cover sheet 300 which is freely opened and closed with an unillustrated fastener.

The cushion member 310 is equivalent to the breathable cushion layer 101 of the mattress 100 according to the first embodiment, and is a filament three-dimensional bonded member which is formed by three-dimensionally fusing filaments (threads) made of a thermoplastic resin and which has a high porosity so as to have excellent breathability.

The mattress cover sheet 300 includes: a breathable water-repellent layer 301; a breathable water-retentive layer 302 which is provided on the upper side of the breathable water-repellent layer 301; and a non-water-retentive water permeable layer 303 which is provided on an outer peripheral portion of the breathable water-retentive layer 302 (including the upper side of the breathable water-retentive layer 302), and is formed as a whole in the shape of a bag which can store the entire cushion member 310.

More specifically, the breathable water-repellent layer 301 is provided in the shape of a bag so as to cover, in all directions, the cushion member 310 inserted within the mattress cover sheet 300, and the breathable water-retentive layer 302 is provided in the shape of a sheet which covers the upper side of the breathable water-repellent layer 301. The non-water-retentive water permeable layer 303 is provided so as to cover the breathable water-repellent layer 301 and the breathable water-retentive layer 302 from outside. The materials and the structures of the breathable water-repellent layer 301, the breathable water-retentive layer 302 and the non-water-retentive water permeable layer 303 are the same as those of the breathable water-repellent layer 202, the breathable water-retentive layer 203 and the non-water-retentive water permeable layer 204 in the mattress 200 of the second embodiment.

The breathable water-repellent layer 301 may be provided so as to cover only the upper side of the cushion member 310, and the non-water-retentive water permeable layer 303 may be provided so as to cover only the upper side of the breathable water-retentive layer 302. The breathable water-retentive layer 302 may be provided so as to cover the breathable water-repellent layer 301 in all directions.

Here, an example of the detailed configuration of the breathable water-retentive layer 302 is shown in FIGS. 8(*a*) to 8(*c*). FIG. 8(*a*) is a cross-sectional view taken along a predetermined cross section of the breathable water-retentive layer 302 (B-B' cross section shown in FIG. 8(*b*)), and FIG. 8(*b*) is a top view of an upper layer 351. In FIG. 8(*a*), hole portions in the individual layers are omitted. FIG. 8(*c*) is a partially enlarged view of FIG. 8(*a*), and also shows the positional relationship of the hole portions in the individual layers in cross section.

The breathable water-retentive layer 302 shown in FIGS. 8(*a*) to 8(*c*) has a structure where the upper layer 351, a middle layer 352 and a lower layer 353 each of which is formed of a high water-absorption material such as chamois are sequentially stacked from above. In the upper layer 351, the middle layer 352 and the lower layer 353, a large number of hole portions 351*a* to 353*a* are provided. The hole portions 351*a* to 353*a* in the individual layers are through holes having, for example, a diameter of 3 to 5 mm and are uniformly provided at substantially regular intervals in the individual layers.

As shown in FIG. 8(*c*), the hole portions 351*a* to 353*a* in the individual layers are arranged so as to be displaced layer by layer. More specifically, the hole portions 351*a* to 353*a* in the individual layers overlap each other such that hole portions in adjacent layers communicate with each other but they are arranged such that a portion (portion in which the hole portions in all the layers are overlaid on each other) which vertically penetrates the breathable water-retentive layer 302 is prevented from being produced. In this way, in the breathable water-retentive layer 302, the upper surface and the lower surface communicate with each other through the hole portions 351*a* to 353*a* in the individual layers, and thus an air passage (see an arrow solid line in FIG. 8(*c*)) is formed, with the result that satisfactory breathability is acquired.

Figure 8A:
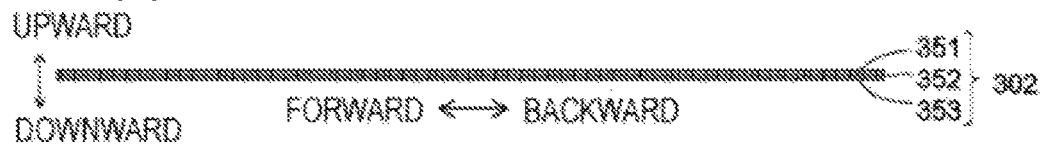
FIGS. 8(a) to 8(c) Illustrative views showing an example of the detailed configuration of a breathable water-retentive layer.
Figure 8B:
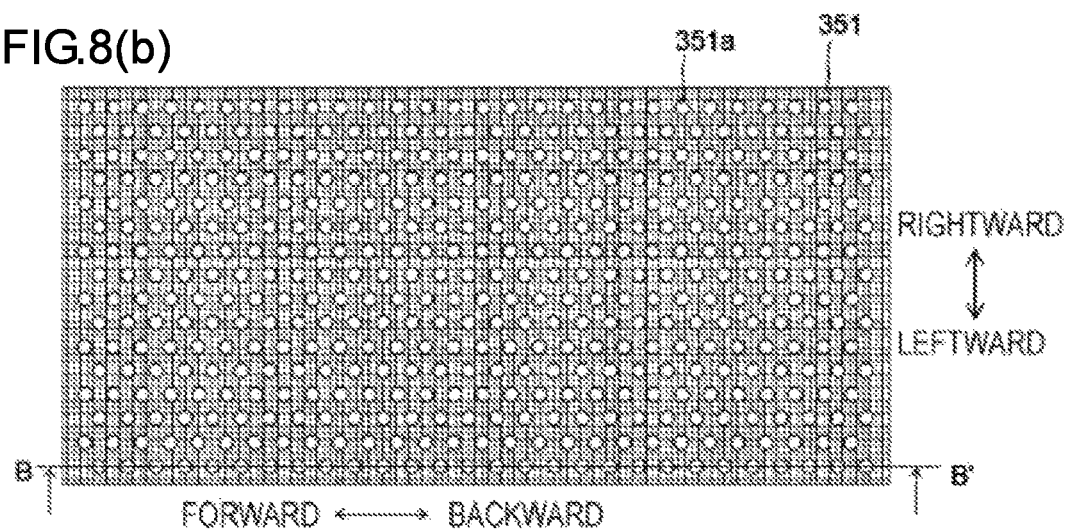
Figure 8C:
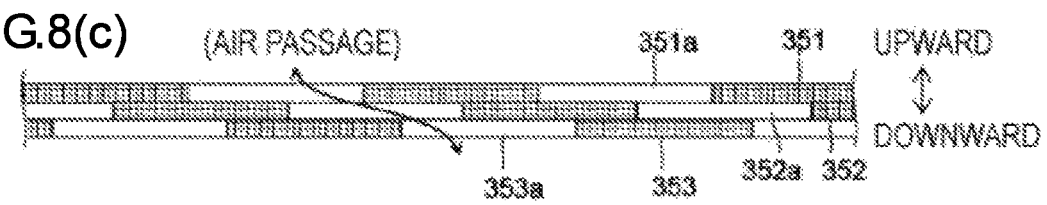

Furthermore, since the hole portions 351*a* to 353*a* in the individual layers are arranged so as not to vertically penetrate the breathable water-retentive layer 302, the air passage is long, and thus the easy movement of water (such as milk and drool) infiltrated from the hole portion 351*a* of the upper portion 351 into the breathable water-retentive layer 302 to the lower surface is reduced. In this way, the breathable water-retentive layer 302 sufficiently absorbs water infiltrated into the hole portion 351a of the upper portion 351, and thus satisfactory water retention is acquired. The structure of the breathable water-retentive layer shown in FIGS. 8(a) to 8(c) is not limited to the present embodiment, and can be applied to the breathable water-retentive layers in the other embodiments.

In the mattress cover sheet 300, the unillustrated fastener is provided. The fastener is opened, and thus the cushion member 310 is freely removable whereas when the fastener is closed, and thus it is possible to prevent the inserted cushion member 310 from being removed arbitrarily. Although the position in which this fastener is provided is not particularly limited, for example, the fastener is preferably provided in the vicinity of an end portion on any one of front, back, left and right sides so that the cushion member 310 is easily removed and that a comfortable sleep is not inhibited.

In the mattress 350 of the present embodiment, on the upper side of the cushion member 310, the breathable water-repellent layer 301, the breathable water-retentive layer 302 and the non-water-retentive water permeable layer 303 are sequentially stacked from below. Hence, it is possible to obtain the effect which is equivalent to or corresponds to the mattress 200 of the second embodiment.

Furthermore, in the present embodiment, it is easy to remove the cushion member 310 from the mattress cover sheet 300 and to wash only the mattress cover sheet 300, and thus it is easier to keep the mattress 350 clean.

Since the mattress 350 has the reversible specification in which the mattress 350 can be used even when it is turned upside down, the breathable water-retentive layer 302 and the non-water-retentive water permeable layer 303 may be provided on both the upper and lower sides of the cushion member 310. The advantages of the reversible specification are the same as described in the first embodiment.

4. Fourth Embodiment

Figure 9:
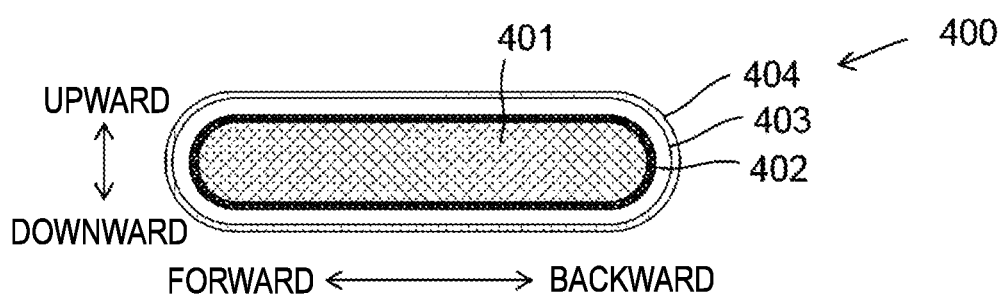
FIG. 9 A cross-sectional view of a pillow according to a fourth embodiment.

A fourth embodiment of the present invention will then be described. FIG. 9 is a cross-sectional view of a pillow 400 according to the fourth embodiment (cross-sectional view taken along a plane which laterally divides the pillow 400). The pillow 400 includes: a breathable cushion layer 401 which is breathable; a breathable water-repellent layer 402 which is breathable and water-repellent; a breathable water-retentive layer 403 which is water-retentive and is breathable during water retention; and a non-water-retentive water permeable layer 404.

The materials, the structures, the positional relationship and the like of the breathable cushion layer 401, the breathable water-repellent layer 402 and the breathable water-retentive layer 403 are respectively the same as the breathable cushion layer 151, the breathable water-repellent layer 152 and the breathable water-retentive layer 153 in the pillow 150 of the first embodiment, and thus the detailed description thereof will be omitted.

On the other hand, the non-water-retentive water permeable layer 404 is provided so as to cover the entire breathable water-retentive layer 403 (including the surface on the upper side of the breathable water-retentive layer 403). The upper surface of the non-water-retentive water permeable layer 404 is the upper-side surface of the pillow 400.

The non-water-retentive water permeable layer 404 is a layer that is formed of a porous non-absorbent hydrophilic material which is excellent in breathability and water permeability (water passage, moisture permeability) and which is unlikely to retain water. The non-water-retentive water permeable layer 404 has an appropriate hydrophilicity and also has water permeability higher than (water retention lower than) the breathable water-retentive layer 403. The non-water-retentive water permeable layer 404 can be formed of, for example, porous cloth obtained by spinning, in the shape of a gauze, a polyester fiber or an acrylic fiber obtained by copolymerizing a hydrophobic monomer which does not include a hydroxyl group and a hydrophilic monomer which includes a hydroxyl group.

The non-water-retentive water permeable layer 404 has such action that the non-water-retentive water permeable layer 404 is tightly adhered to the face and head of the infant who lies on the mattress 200 so as to quickly guide sweat to the breathable water-retentive layer 403 and to evaporate sweat into the atmosphere. In this way, it is possible to obtain an effect of reducing a problem in which the skin of the infant becomes sticky due to water such as sweat, and thus it is possible to more enhance comfort.

5. Fifth Embodiment

Figure 10:
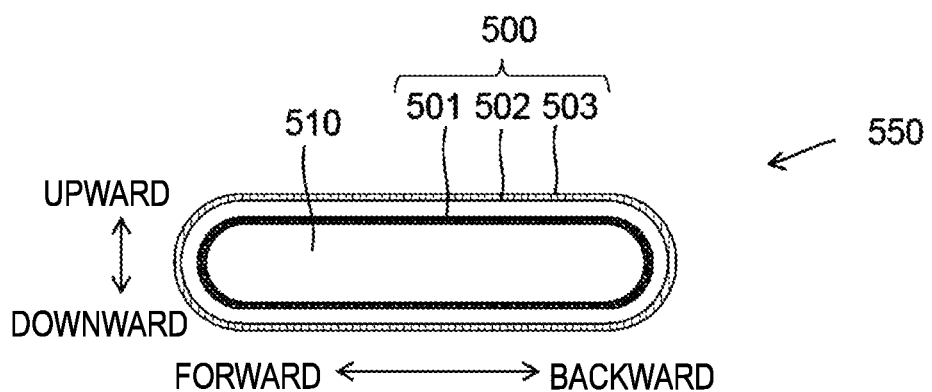
FIG. 10 A cross-sectional view of a pillow according to a fifth embodiment.

A fifth embodiment of the present invention will then be described. FIG. 10 is a cross-sectional view of a pillow 550 according to the fifth embodiment. In the present embodiment, attention is focused on the description of a pillow cover sheet 500, and thus with consideration given to ease of viewing, a cushion member 510 is displayed in white with a black outline.

The pillow 550 is formed with the cushion member 510 and the pillow cover sheet 500 (one form of the bedding cover sheet) which covers an outer peripheral portion of the cushion member 510. The mattress 550 is in a state where the cushion member 510 is inserted in the bag-shaped pillow cover sheet 500 which is freely opened and closed with an unillustrated fastener.

The cushion member 510 is equivalent to the breathable cushion layer 151 of the pillow 150 according to the first embodiment, and is a filament three-dimensional bonded member which is formed by three-dimensionally fusing filaments (threads) made of a thermoplastic resin and which has a high porosity so as to have excellent breathability.

The mattress cover sheet 500 includes: a breathable water-repellent layer 501; a breathable water-retentive layer 502 which is provided on an outer peripheral portion of the breathable water-repellent layer 501; and a non-water-retentive water permeable layer 503 which is provided on an outer peripheral portion of the breathable water-retentive layer 502, and is formed as a whole in the shape of a bag which can store the entire cushion member 510.

More specifically, the breathable water-repellent layer 501 is provided in the shape of a bag so as to cover the entire outer side of the cushion member 510 inserted within the pillow cover sheet 500. The breathable water-retentive layer 502 is provided so as to cover the entire outer side of the breathable water-repellent layer 501, and the non-water-retentive water permeable layer 503 is provided so as to cover the entire outer side of the breathable water-retentive layer 502. The materials and the structures of the breathable water-repellent layer 501, the breathable water-retentive layer 502 and the non-water-retentive water permeable layer 503 are the same as those of the breathable water-repellent layer 402, the breathable water-retentive layer 403 and the non-water-retentive water permeable layer 404 in the pillow 400 of the fourth embodiment.

In the pillow cover sheet 500, the unillustrated fastener is provided. The fastener is opened, and thus the cushion member 510 is freely removable whereas when the fastener is closed, and thus it is possible to prevent the inserted cushion member 510 from being removed arbitrarily. Although the position in which this fastener is provided is not particularly limited, for example, the fastener is preferably provided in the vicinity of an end portion on any one of left and right sides so that the cushion member 510 is easily removed and that a comfortable sleep is not inhibited.

In the pillow 550 of the present embodiment, on the upper side of the cushion member 510, the breathable water-repellent layer 501, the breathable water-retentive layer 502 and the non-water-retentive water permeable layer 503 are sequentially stacked from below. Hence, it is possible to obtain the effect which is equivalent to or corresponds to the pillow 400 of the fourth embodiment.

Furthermore, in the present embodiment, it is easy to remove the cushion member 510 from the pillow cover sheet 500 and to wash only the pillow cover sheet 500, and thus it is easier to keep the pillow 550 clean.

6. Sixth Embodiment

Figure 11:
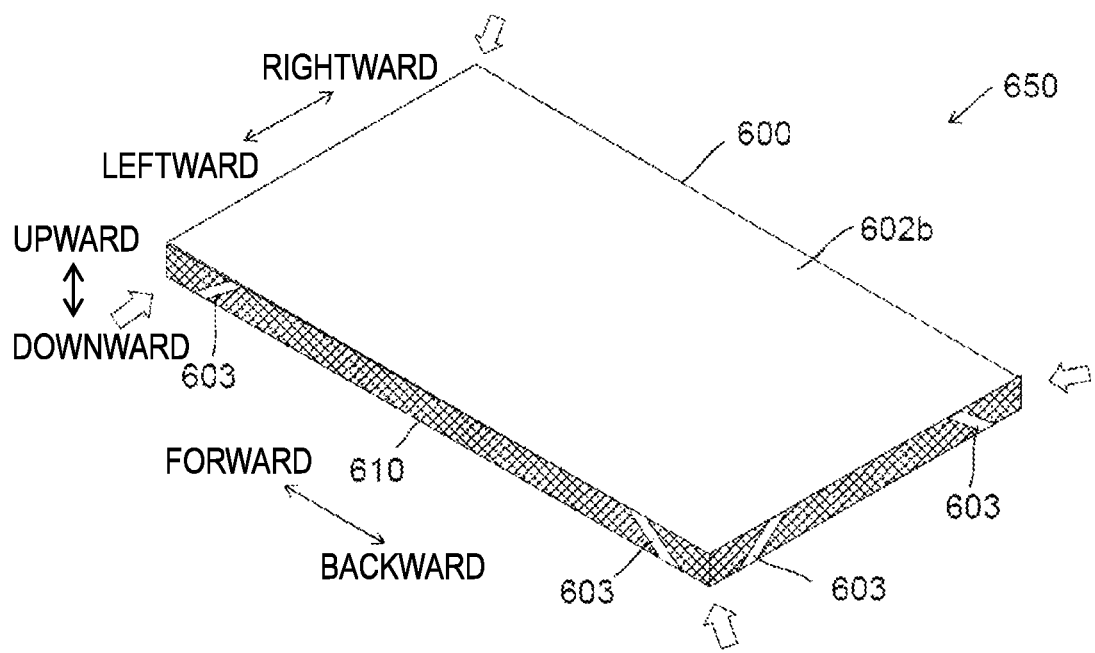
FIG. 11 An external perspective view of a mattress according to a sixth embodiment.
Figure 12:
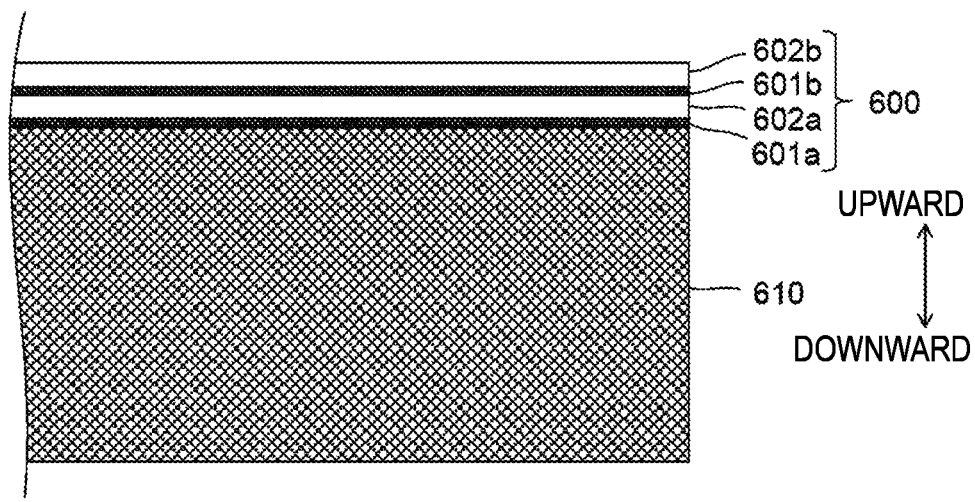
FIG. 12 A cross-sectional view of the mattress according to the sixth embodiment.

A sixth embodiment of the present invention will then be described. FIG. 11 is an external perspective view of a mattress 650 according to the sixth embodiment, and FIG. 12 is a vertical cross-sectional view of the mattress 650.

The mattress 650 is formed with a cushion member 610 and a mattress cover sheet 600 (one form of the bedding cover sheet) which covers an upper portion of the cushion member 610 in the vertical direction. As shown in FIG. 11, in four corner portions (portions indicated by arrows in white with black outlines) of the upper surface of the mattress cover sheet 600, fixing rubber bands 603 are individually arranged. The fixing rubber bands 603 in the individual corner portions are in a state where they are hooked on the corner portions of the cushion member 610 (state where parts thereof are put around the lower surfaces of the cushion member 610), and by the surface tension thereof, the mattress cover sheet 600 is fixed to an upper portion of the cushion member 610.

The cushion member 610 is equivalent to the breathable cushion layer 101 of the mattress 100 according to the first embodiment, and is a filament three-dimensional bonded member which is formed by three-dimensionally fusing filaments (threads) made of a thermoplastic resin and which has a high porosity so as to have excellent breathability.

The mattress cover sheet 600 includes a first breathable water-repellent layer 601a, a first breathable water-retentive layer 602a, a second breathable water-repellent layer 601b and a second breathable water-retentive layer 602b, and these layers are sequentially stacked upward in the vertical direction of the cushion member 610. The materials and structures of the first and second breathable water-repellent layers 601a and 601b are the same as those of the breathable water-repellent layer 202 in the mattress 200 of the second embodiment. The materials and structures of the first and second breathable water-retentive layers 602a and 602b are the same as those of the breathable water-retentive layer 203 in the mattress 200 of the second embodiment.

Since in the present embodiment, two contact interfaces between the breathable water-retentive layers and the breathable water-repellent layers which are provided downward in the vertical direction are formed, even when a local high pressure is applied to the breathable water-retentive layer, it is possible to reduce the movement of milk, drool and the like whose main component is water. The breathable water-retentive layer and the breathable water-repellent layer may be alternately stacked such that three or more contact interfaces are formed between the breathable water-retentive layers and the breathable water-repellent layers which are provided downward in the vertical direction.

7. General Overview

Although the embodiments of the present invention are described above, the configuration of the present invention is not limited to the embodiments described above, and various modification can be made without departing from the spirit of the invention. For example, in the mattress, the pillow and the bedding cover sheet according to the embodiments of the present invention, as long as milk, drool and the like vomited by the infant are absorbed by the breathable water-retentive layer, and thus breathability is acquired even in a wet state, a plurality of non-water-retentive water permeable layers and breathable water-repellent layers may be provided.

It should be considered that the embodiments described above are illustrative in all respects, rather than restrictive. It should also be considered that the technical scope of the present invention is indicated not by the description of the embodiments discussed above but by the scope of claims, and that meanings equivalent to the scope of claims and all modifications within the scope are included therein.

INDUSTRIAL APPLICABILITY

The present invention can be utilized for bedding for infants and the like.

The invention claimed is:

1. A bedding in which on an upper side of a breathable cushion layer, a breathable water-repellent layer and a breathable water-retentive layer for reducing infiltration of water into the cushion layer are provided,
   wherein the cushion layer is formed with a filament three-dimensional bonded member,
   the breathable water-repellent layer is a porous fabric or a porous knitted fabric formed of one or two or more hydrophobic fibers selected from a polyester fiber, a nylon fiber, an acrylic fiber, a polyester fiber on which water-repellent processing is performed, and a fluorocarbon fiber on which water-repellent processing is performed, or the breathable water-repellent layer is a porous sheet formed of a polytetrafluoroethylene,
   the breathable water-repellent layer has a breathability of equal to or more than 150 $c^3/n^2 \cdot s$ in an amount of air passing through the breathable water-repellent layer at a pressure difference of 125 Pa,
   the breathable water-retentive layer is a porous fabric or knitted fabric formed of one or two or more hydrophilic fibers selected from a cotton fiber, a hemp fiber and a rayon fiber,
   the breathable water-retentive layer has a breathability of equal to or more than 150 $cm^3/cm^2 \cdot s$ in an amount of air passing through the breathable water-retentive layer in a state where 80 g of water is retained per 20 cm×20 cm at a pressure difference of 125 Pa,
   the breathable water-retentive layer is provided on an upper side of the breathable water-repellent layer,
   the breathable water-retentive layer absorbs water present in a hole portion of the breathable water-repellent layer by attracting water in an interface between the breathable water-retentive layer and the breathable water-repellent layer, and enhances breathability.

2. The bedding according to claim 1, wherein the breathable water-repellent layer is a porous fabric or a porous knitted fabric formed of hydrophobic fibers in which 1,000 to 10,000 holes having a diameter of 0.5 to 2 mm are formed per 100 square centimeters, whose thickness is 0.5 to 5 mm, or the breathable water-repellent layer is a porous sheet formed of polytetrafluoroethylene in which 300 to 3,000 holes having a diameter of 1 to 2 mm are formed per 100 square centimeters, whose thickness is 0.5 to 2 mm.

3. The bedding according to claim 1, wherein the breathable water-retentive layer is a porous fabric or a porous knitted fabric in which 100 to 3,000 holes having a diameter of 1 to 5 mm are formed per 100 square centimeters, whose thickness is 0.5 to 5 mm.

4. The bedding according to claim 2, wherein the breathable water-retentive layer is a porous fabric or a porous knitted fabric in which 100 to 3,000 holes having a diameter of 1 to 5 mm are formed per 100 square centimeters, whose thickness is 0.5 to 5 mm.

5. A bedding cover sheet which is removable with respect to a cushion member that is breathable and which forms bedding together with the cushion member, wherein the bedding cover sheet is formed such that the breathable water-retentive layer is arranged on an upper side of the breathable water-repellent layer to reduce infiltration of water into the cushion layer, the breathable water-repellent layer is a porous fabric or a porous knitted fabric formed of one or two or more hydrophobic fibers selected from a polyester fiber, a nylon fiber, an acrylic fiber, a polyester fiber on which water-repellent processing is performed, and a fluorocarbon fiber on which water-repellent processing is performed, or the breathable water-repellent layer is a porous sheet formed of a polytetrafluoroethylene, the breathable water-repellent layer has a breathability of equal to or more than 150 cm$^3$/cm$^2$·s in an amount of air passing through the breathable water-repellent layer at a pressure difference of 125 Pa, the breathable water-retentive layer is a porous fabric or knitted fabric formed of one or two or more hydrophilic fibers selected from a cotton fiber, a hemp fiber and a rayon fiber, the breathable water-retentive layer has a breathability of equal to or more than 150 cm$^3$/cm$^2$·s in an amount of air passing through the breathable water-retentive layer in a state where 80 g of water is retained per 20 cm×20 cm at a pressure difference of 125 Pa, the breathable water-retentive layer is provided on an upper side of the breathable water-repellent layer, the breathable water-retentive layer absorbs water present in a hole portion of the breathable water-repellent layer by attracting water in an interface between the breathable water-retentive layer and the breathable water-repellent layer, and enhances breathability.

6. The bedding cover sheet according to claim 5, wherein the breathable water-repellent layer is a porous fabric or a porous knitted fabric formed of hydrophobic fibers in which 1,000 to 10,000 holes having a diameter of 0.5 to 2 mm are formed per 100 square centimeters, whose thickness is 0.5 to 5 mm, or the breathable water-repellent layer is a porous sheet formed of polytetrafluoroethylene in which 300 to 3,000 holes having a diameter of 1 to 2 mm are formed per 100 square centimeters, whose thickness is 0.5 to 2 mm.

7. The bedding cover sheet according to claim 5, wherein the breathable water-retentive layer is a porous fabric or a porous knitted fabric in which 100 to 3,000 holes having a diameter of 1 to 5 mm are formed per 100 square centimeters, whose thickness is 0.5 to 5 mm.

8. The bedding cover sheet according to claim 6, wherein the breathable water-retentive layer is a porous fabric or a porous knitted fabric in which 100 to 3,000 holes having a diameter of 1 to 5 mm are formed per 100 square centimeters, whose thickness is 0.5 to 5 mm.

\* \* \* \* \*